US011394522B2

(12) United States Patent
Pelletier et al.

(10) Patent No.: US 11,394,522 B2
(45) Date of Patent: *Jul. 19, 2022

(54) DOWNLINK CONTROL SIGNALING

(71) Applicant: INTERDIGITAL PATENT HOLDINGS, INC., Wilmington, DE (US)

(72) Inventors: Ghyslain Pelletier, Montreal (CA); Paul Marinier, Brossard (CA); Marian Rudolf, Montreal (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/989,854

(22) Filed: Aug. 10, 2020

(65) Prior Publication Data

US 2020/0374094 A1 Nov. 26, 2020

Related U.S. Application Data

(63) Continuation of application No. 15/547,250, filed as application No. PCT/US2016/015452 on Jan. 28, 2016, now Pat. No. 10,785,012.

(Continued)

(51) Int. Cl.
*H04L 5/00* (2006.01)
*H04L 1/18* (2006.01)
*H04W 88/02* (2009.01)

(52) U.S. Cl.
CPC ............ *H04L 5/0094* (2013.01); *H04L 5/001* (2013.01); *H04L 5/0053* (2013.01);
(Continued)

(58) Field of Classification Search
CPC ...... H04L 5/0084; H04L 5/001; H04L 5/0053; H04L 1/1896; H04L 1/1822; H04W 88/02
See application file for complete search history.

(56) References Cited

U.S. PATENT DOCUMENTS 10,785,012 B2 * 9/2020 Pelletier .................. H04L 5/001
2012/0078933 A1 3/2012 Kim et al.
(Continued)

FOREIGN PATENT DOCUMENTS

CN 101809897 A 8/2010
CN 102474400 A 5/2012
(Continued)

OTHER PUBLICATIONS

3rd Generation Partnership Project (3GPP), TS 36.211 V12.1.0, "Technical Specification Group Radio Access Network, Evolved Universal Terrestrial Radio Access (E-UTRA), Physical Channels and Modulation (Release 12)", Mar. 2014, pp. 1-120.
(Continued)

*Primary Examiner* — Brenda H Pham
(74) *Attorney, Agent, or Firm* — Flaster Greenberg, P.C.

(57) ABSTRACT

Techniques for efficient downlink control with a large number of carriers and/or TTIs are described. Techniques for blind decoding reduction may include making the search space and/or aggregation level of candidates for a first PDCCH/E-PDCCH associated with the characteristics of a second received PDCCH/E-PDCCH. Techniques may include embedding DCI for a set of serving cells and/or TTIs in a PDSCH. DCI for a set of serving cells and/or TTIs may be included in single PDCCH/E-PDCCH. To reduce overhead, carrier indicator field interpretation may be associated with the serving cell or TTI from which the PDCCH/E-PDCCH containing the downlink control information is received, or the group of cells or TTIs to which the PDCCH/
(Continued)

E-PDCCH containing the downlink control information belongs.

12 Claims, 5 Drawing Sheets

Related U.S. Application Data

(60) Provisional application No. 62/161,089, filed on May 13, 2015, provisional application No. 62/144,861, filed on Apr. 8, 2015, provisional application No. 62/109,003, filed on Jan. 28, 2015.

(52) U.S. Cl.
CPC .......... *H04L 1/1822* (2013.01); *H04L 1/1896* (2013.01); *H04W 88/02* (2013.01)

(56) References Cited

U.S. PATENT DOCUMENTS

| | | |
|---|---|---|
| 2012/0113944 A1 | 5/2012 | Yang et al. |
| 2013/0136006 A1 | 5/2013 | Kim et al. |
| 2013/0163543 A1 | 6/2013 | Freda et al. |
| 2014/0029490 A1 | 1/2014 | Kim et al. |
| 2014/0050130 A1* | 2/2014 | Kim .................. H04L 5/1469 370/280 |
| 2014/0204888 A1 | 7/2014 | Chung et al. |
| 2014/0348093 A1 | 11/2014 | Ihm et al. |
| 2015/0043524 A1 | 2/2015 | Kim et al. |
| 2016/0007373 A1* | 1/2016 | Davydov ............ H04L 27/0006 370/329 |
| 2017/0195999 A1 | 7/2017 | Feng et al. |

FOREIGN PATENT DOCUMENTS

| | | |
|---|---|---|
| CN | 102625456 A | 8/2012 |
| CN | 104012159 A | 8/2014 |
| WO | 2011/035420 A1 | 3/2011 |

OTHER PUBLICATIONS

3rd Generation Partnership Project (3GPP), TS 36.212 V12.0.0, "Technical Specification Group Radio Access Network, Evolved Universal Terrestrial Radio Access (E-UTRA), Multiplexing and Channel Coding (Release 12)", Dec. 2013, pp. 1-88.

3rd Generation Partnership Project (3GPP), TS 36.213 V12.1.0, "Technical Specification Group Radio Access Network, Evolved Universal Terrestrial Radio Access (E-UTRA), Physical Layer Procedures (Release 12)", Mar. 2014, pp. 1-186.

* cited by examiner

DOWNLINK CONTROL SIGNALING

CROSS-REFERENCE TO RELATED APPLICATIONS

This application is a continuation of U.S. Non-Provisional application Ser. No. 15/547,250, filed Jul. 28, 2017, which is the National Stage entry under 35 U.S.C. § 371 of Patent Cooperation Treaty Application PCT/US2016/015452, filed Jan. 28, 2016, which claims the benefit of U.S. Provisional Patent Application No. 62/109,003, filed Jan. 28, 2015, of U.S. Provisional Patent Application No. 62/144,861, filed Apr. 8, 2015, and of U.S. Provisional Patent Application No. 62/161,089, filed May 13, 2015, the contents of which are incorporated by reference herein.

BACKGROUND

Carrier aggregation for LTE was introduced in 3GPP Release 10. Carrier aggregation allows a WTRU to transmit and/or receive on more than one carrier simultaneously, which can result in an increase of peak data rate over the air interface. According to Release 10 operation, the maximum number of carriers that can be aggregated may be up to five (5), for a potential maximum bandwidth of 100 MHz.

Transmission of data in the downlink and uplink in LTE may be performed using the physical downlink shared channel (PDSCH) and/or physical uplink shared channel (PUSCH). The network can dynamically indicate downlink control information (DCI) pertaining to a certain PDSCH or PUSCH transmission using the physical downlink control channel (PDCCH) and/or the enhanced physical downlink control channel (E-PDCCH), for example on a per-subframe basis. To receive the PDCCH and/or E-PDCCH, a wireless transmit/receive unit (WTRU) may perform blink decoding, during which the WTRU may attempt reception of the DCI in one or more search spaces. One or more, or each, search space may include a number of PDCCH or E-PDCCH candidates which the WTRU attempts to decode.

SUMMARY

Carrier aggregation may be used to increase overall system throughput, increase individual WTRU data rates, and/or allow the network to serve a larger number of WTRUs relatively simultaneously. Techniques for reducing blind decoding and overhead may improve the efficiency for carrier aggregation implementation. For example, the search space and/or aggregation level of carriers or TTIs may be associated with the characteristics of a second received PDCCH/E-PDCCH. To reduce overhead, carrier indicator field interpretation may be associated with the serving cell or TTI from which the PDCCH/E-PDCCH containing the downlink control information is received, or the group of cells or TTIs to which the PDCCH/E-PDCCH containing the downlink control information belongs.

A wireless transmit/receive unit (WTRU) may implement a method for efficient downlink control or be configured to perform the method. For example, the WTRU may decode first downlink control information (DCI) via a downlink control channel of a first serving cell. The first DCI may include scheduling information for a first physical downlink shared channel (PDSCH) transmission received by the WTRU via the first serving cell. The WTRU may receive the first PDSCH transmission via the first serving cell in accordance with the first DCI. The first PDSCH transmission may comprise a second DCI. The second DCI may comprise scheduling information for a second physical downlink shared channel transmission (PDSCH) transmission received by the WTRU via a second serving cell. The WTRU may receive the second PDSCH transmission via the second serving cell in accordance with the second DCI.

For example, bits of the second DCI may be multiplexed with bits of a transport channel used for user data transmission in the first PDSCH transmission. The bits of the second DCI and the bits of the transport channel used for user data transmission may be multiplexed for transmission prior to being mapped to modulated symbols of the first PDSCH transmission. The WTRU may determine a first cyclic redundancy check (CRC) for the bits of the second DCI and a second CRC for the bits of the transport channel used for user data transmission. In the method, the bits of the second DCI may be mapped to specific modulated symbols of the first PDSCH transmission. The WTRU may determine to which modulated symbols of the first PDSCH transmission the second DCI is mapped to based on one or more of a cell identification (ID) of the second cell, a WTRU ID used by the WTRU in the second cell, a subframe number of the second cell, or a component carrier number of the second cell. The first DCI may include an indication of whether or not the second DCI is to be included in the first PDSCH transmission. The indication of whether or not the second DCI is to be included in the first PDSCH transmission may correspond to a flag bit in the first DCI. The indication of whether or not the second DCI is to be included in the first PDSCH transmission may correspond to a code point setting in the first DCI. The indication of whether or not the second DCI is to be included in the first PDSCH transmission may correspond to a sequence of phase values of known time symbols. The indication of whether or not the second DCI is to be included in the first PDSCH transmission may corresponds to a sequence of phase values of known frequency symbols.

In the method, the downlink control channel may correspond to one of a physical downlink control channel (PDCCH) or an enhanced PDCCH (E-PDCCH). The WTRU may send feedback indicating whether the second DCI is successfully decoded from the first PDSCH transmission. The feedback may be separate from an acknowledgement of user data reception from the first PDSCH transmission. The WTRU may send the feedback at regular time intervals. The WTRU may send the feedback when inquired by an eNB about a success rate of decoding DCIs.

For example, the WTRU may decode first downlink control information (DCI) via a downlink control channel of a first serving cell. The first DCI may include scheduling information for a first physical downlink shared channel (PDSCH) transmission received by the WTRU via a first serving cell. The WTRU may decode a second DCI via the downlink control channel of the first serving cell. The WTRU may receive the first PDSCH transmission via the first serving cell in accordance with the first DCI. The first DCI may be associated with a second DCI. The second DCI may include scheduling information for a second physical downlink shared channel (PDSCH) transmission received by the WTRU via a second serving cell. The WTRU may receive the second PDSCH transmission via the second serving cell in accordance with the second DCI. The downlink control channel may correspond to one of a physical downlink control channel (PDCCH) or an enhanced PDCCH (E-PDCCH). The first and second PDSCH transmissions may include a plurality of transport blocks (TBs). Each transport block may be associated with one of the first or second serving cell. The DCI may include a single set of scheduling parameters. The WTRU may use the single set of scheduling parameters for the plurality of TBs. The DCI may include multiple sets of scheduling parameters. One set of the plurality of scheduling parameters may be associated with each cell. The TB may include a plurality of physical resource blocks (PRBs). Each of the PRBs may be associated with one of the plurality of cells.

A wireless transmit/receive unit (WTRU) may implement a method or be configured to perform the method for determining the validity of a DCI. For example, the WTRU may receive first downlink control channel transmission (DCI). The WTRU may determine a plurality of cyclic redundancy check (CRC) parity bits for a first candidate downlink control information (DCI) from the first downlink control channel transmission. The WTRU may attempt descrambling the plurality of CRC parity bits for the first candidate DCI using a radio network temporary identifier (RNTI) of the WTRU and a valid potential value for at least one field included in the first candidate DCI. The WTRU may determine that the first candidate DCI is valid and applicable to the WTRU based on successfully descrambling the plurality of CRC parity bits for the first candidate DCI using the RNTI of the WTRU and the valid potential value for the at least one field included in the first candidate DC. The at least one field included in the first candidate DCI may contain a downlink antenna indicator (DAI) field. The WTRU may use concatenated bits of the RNTI of the WTRU and of the valid potential value for the at least one field in order to successfully descramble the plurality of CRC parity bits. The WTRU determining that the first candidate DCI is valid and applicable to the WTRU may be further based on successfully descrambling a second DCI. The second DCI and the first candidate DCI may be both received via the downlink control channel of a first cell. The second DCI and the first candidate DCI may be received via the downlink control channel of different cells. The WTRU may determine a type of DCI included in the first candidate DCI based on one or more of a received configuration, the RNTI used to decode the downlink control channel transmission, a location of the downlink control channel transmission in a search space, the search space utilized, or a CRC polynomial utilized. The WTRU may determine which cell the first candidate DCI is applicable to based on a value of a field in the first candidate DCI. The serving cell may correspond to a certain field.

A wireless transmit/receive unit (WTRU) may implement a method or be configured to perform the method for TTI aggregation. For example, the WTRU may decode first downlink control information (DCI) via a downlink control channel in a first transmission time interval (TTI). The first DCI may comprise scheduling information for a first physical downlink shared channel (PDSCH) transmission for the WTRU sent in the first TTI. The WTRU may determine a decoding assumption to use when attempting to decode a second DCI via the downlink control channel based on a property of the first DCI. The second DCI may include scheduling information for a second PDSCH transmission for the WTRU sent in a second TTI. The WTRU may receive the second DCI. The WTRU may receive the first PDSCH transmission in the first TTI in accordance with the first DCI. The WTRU may receive the second PDSCH transmission in the second TTI in accordance with the first DCI. The second DCI may be received in the first TTI. The second DCI may be received in the second TTI. The property of the first DCI may correspond to an aggregation level used for decoding the first DCI. The decoding assumption may include attempting to decode the second DCI using the same aggregation level as was used for decoding the first DCI.

A wireless transmit/receive unit (WTRU) may implement a method or be configured to perform the method for overhead reduction. For example, the WTRU may receive downlink control information (DCI) via a downlink control channel of in a first transmission time interval (TTI). The DCI may include scheduling information for one or more physical downlink shared channel (PDSCH) transmissions received by the WTRU via a plurality TTIs. The WTRU may determine which TTIs correspond to the plurality of TTIs according to a group identity contained in the DCI. The WTRU may receive the one or more PDSCH transmissions during the plurality of TTIs in accordance with the DCI. The group identity may be determined based on at least a carrier indicator field (CIF) of the DCI and the identity of the first TTI during which the first DCI was received. For example, the WTRU may determine which cell a given CIF value is referring to based on the identity of the serving cell over which the CIF (e.g., DCI) was received.

BRIEF DESCRIPTION OF THE DRAWINGS

The following detailed description of example embodiments is provided with reference to the appended drawings. For the purposes of illustration, the drawings show example embodiments. The contemplated subject matter is not limited to the specific elements and/or instrumentalities described or illustrated. And absent specific notation to the contrary, no subject matter is contemplated as necessary and/or essential. In addition, the described embodiments may be employed in any combination, in whole or in part. In the drawings.

DETAILED DESCRIPTION

A detailed description of example embodiments will now be described with reference to the various Figures. Although this description provides a detailed example of possible implementations, it should be noted that the details are intended to be examples and in no way limit the scope of the application. As used herein, the article "a" or "an", absent further qualification or characterization, may be understood to mean "one or more" or "at least one", for example. Also, as used herein, the phrase user equipment (UE) may be understood to mean the same thing as the phrase wireless transmit/receive unit (WTRU).

Figure 1A:
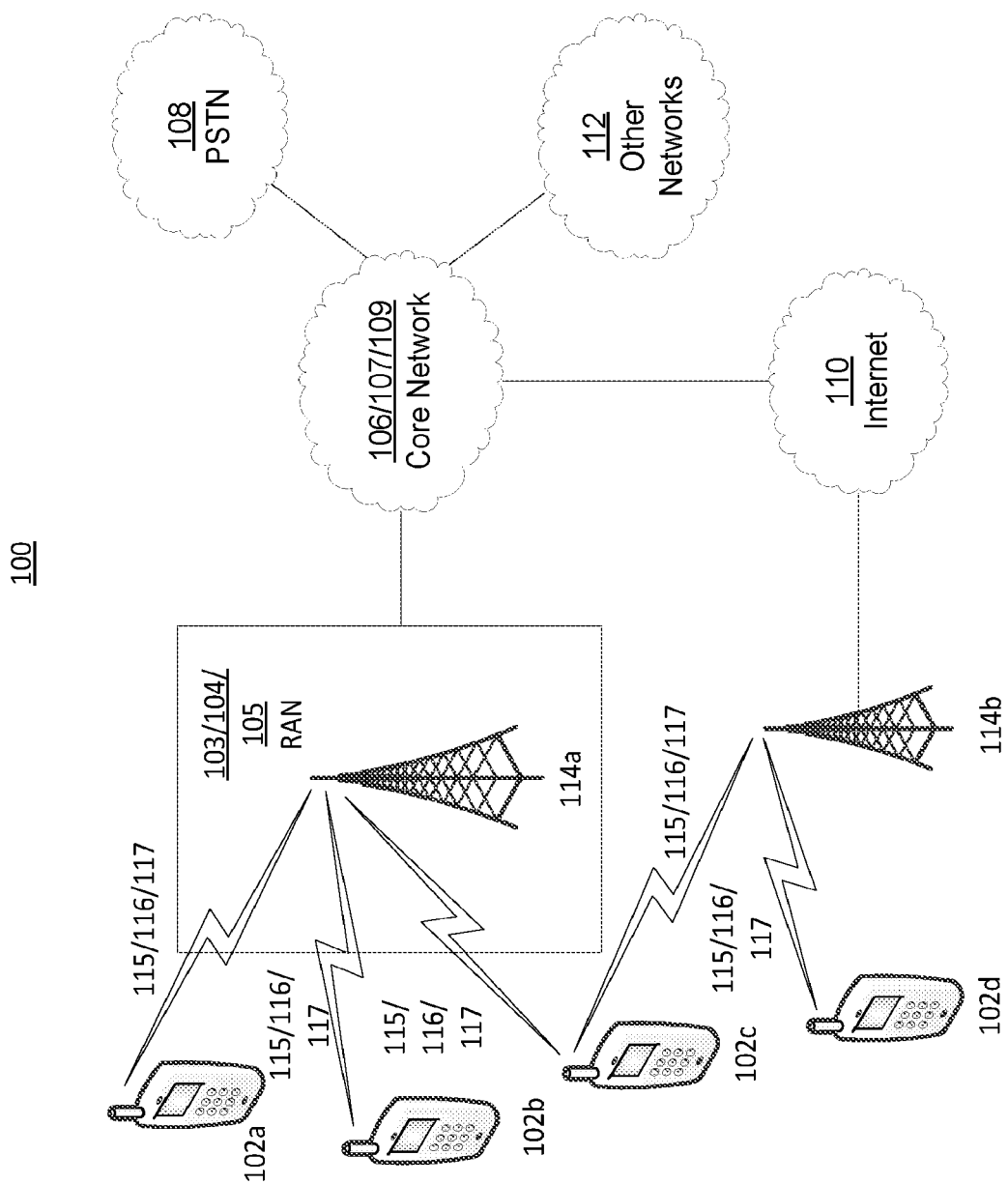
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (TP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
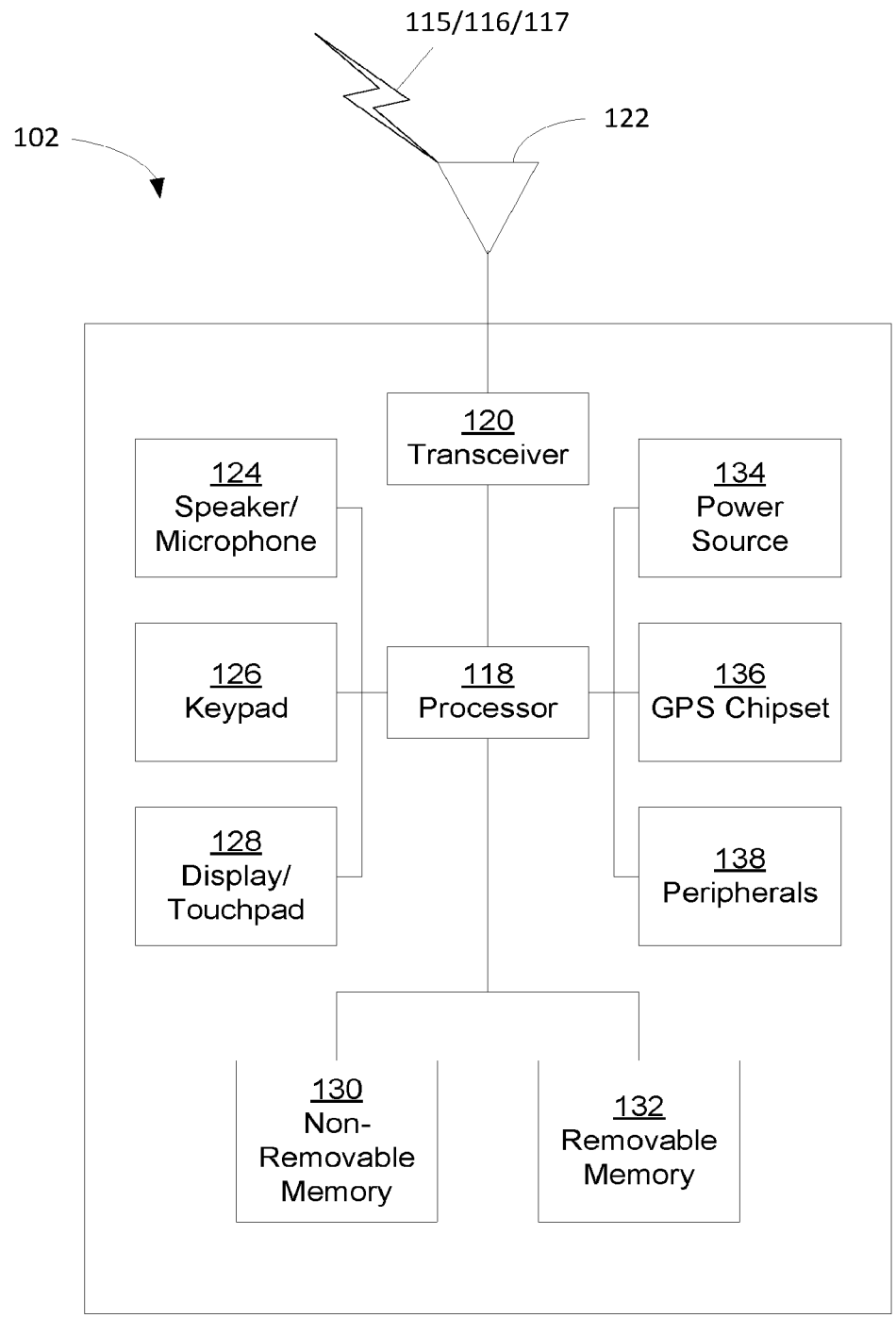
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
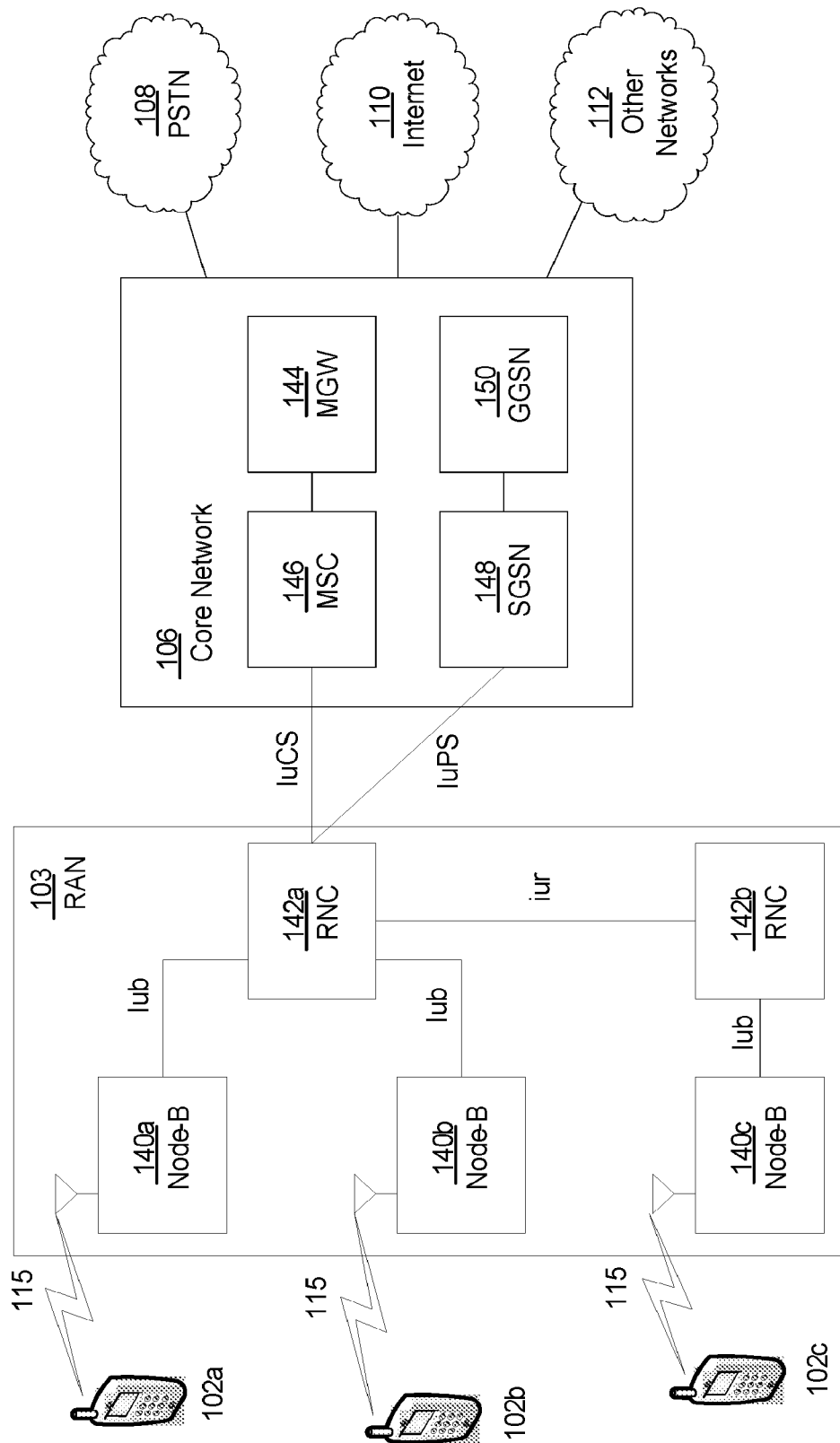
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
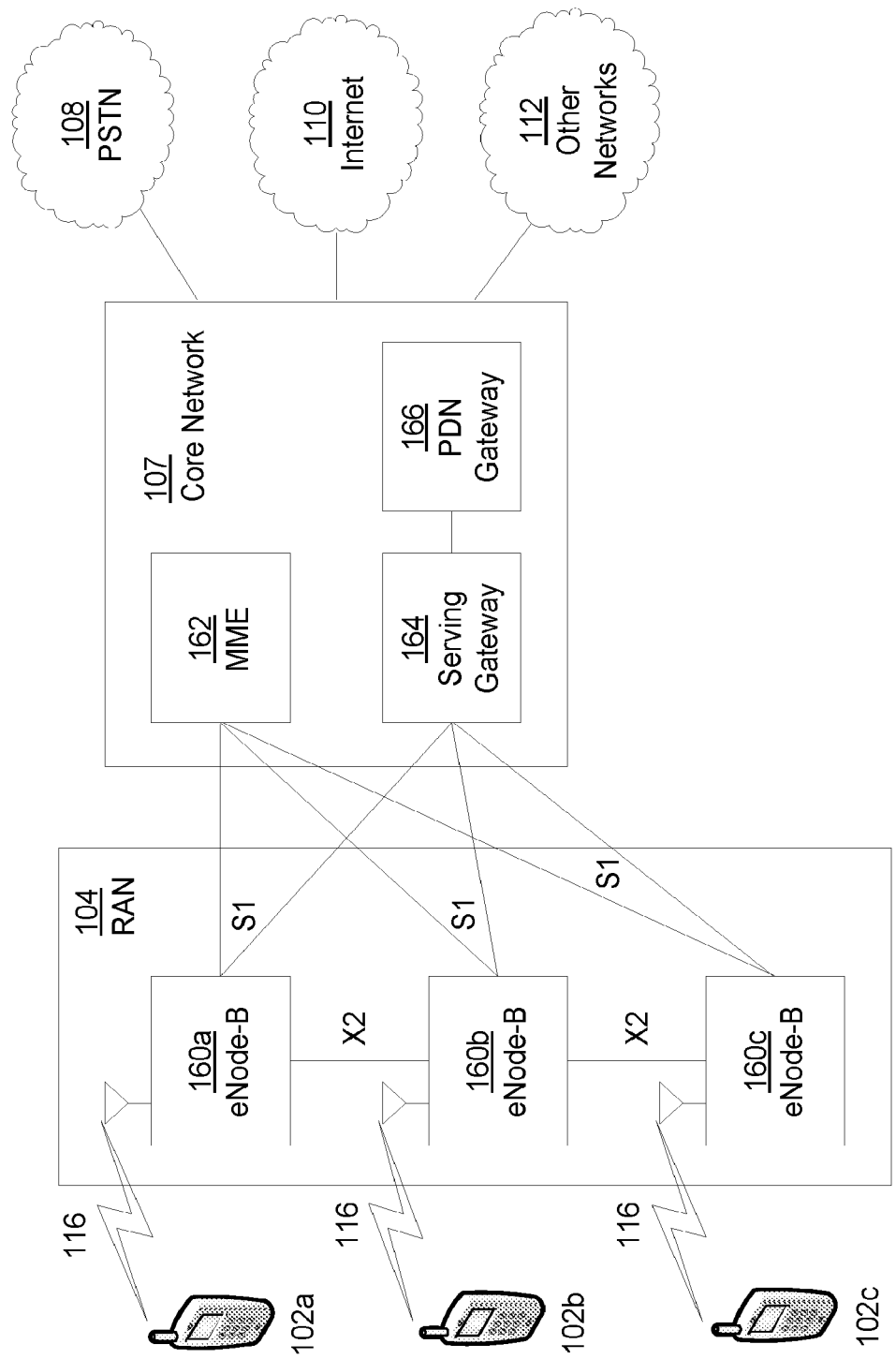
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
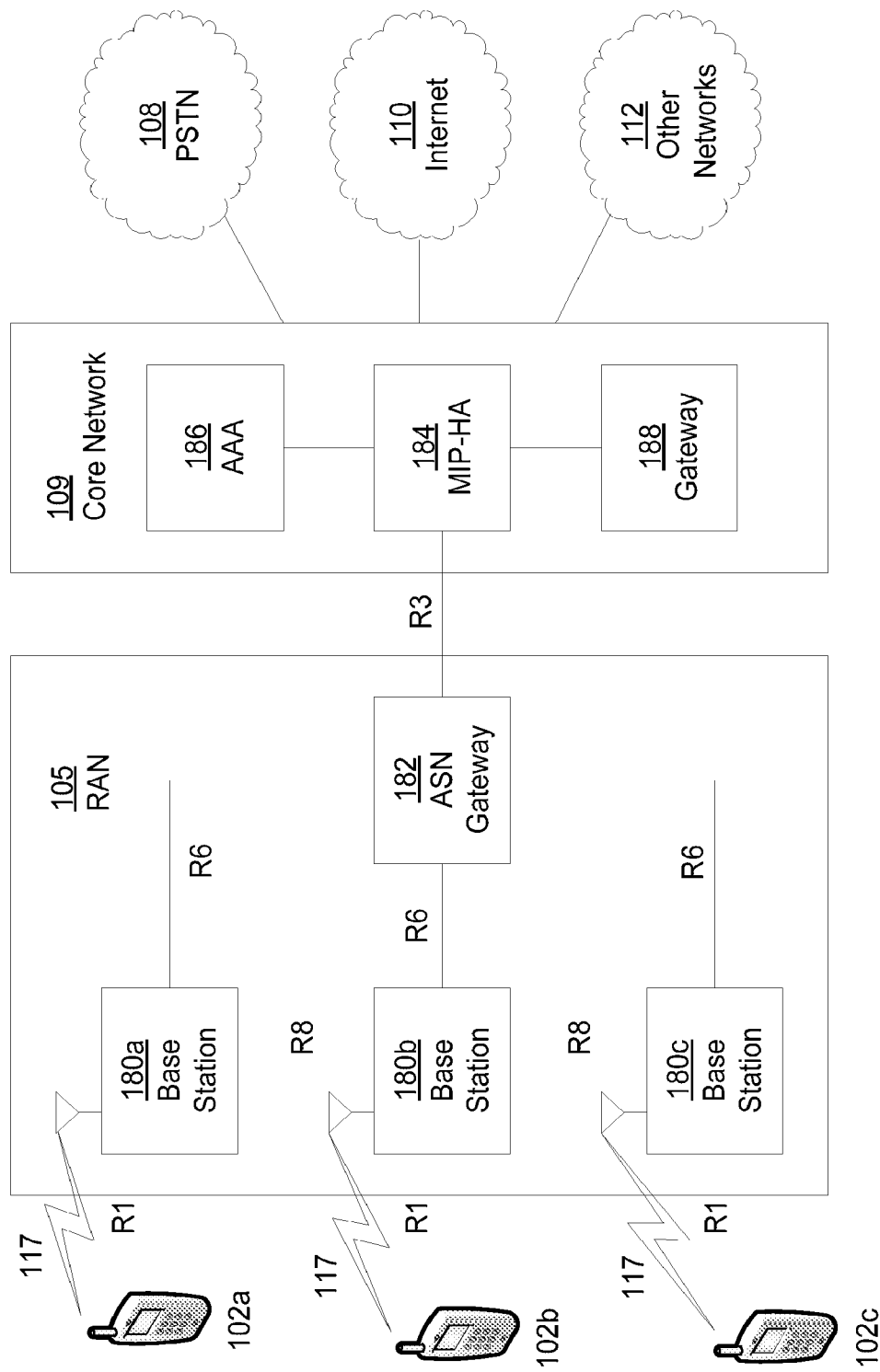
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and 1P-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

In view of FIGS. 1A-1E, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may include one or more of the components described with respect to FIG. 1B, and/or may function in the same and/or similar manner with respect to those components as described herein with respect to WTRU 102(a-d), for example.

In view of FIGS. 1A-1E, and the corresponding description of FIGS. 1A-1E, one or more, or all, of the functions described herein with regard to one or more of: WTRU 102a-d, Base Station 114a-b, Node B 140a-c, RNC 142a-b, MSC 146, SGSN 148, MGW 144, CGSN 150, eNode-B 160a-c, MME 162, Serving Gateway 164, PDN Gateway 166, Base Station 180a-c, ASN Gateway 182, AAA 186, MIP-HA 184, and/or Gateway 188, or the like, may be performed by one or more emulation devices (not shown) (e.g., one or more devices configured to emulate one or more, or all, of the functions described herein).

The one or more emulation devices may be configured to perform the one or more, or all, functions in one or more modalities. For example, the one or more emulation devices may perform the one or more, or all, functions while being fully or partially implemented/deployed as part of a wired and/or wireless communication network. The one or more emulation devices may perform the one or more, or all, functions while being temporarily implemented/deployed as part of a wired and/or wireless communication network. The one or more emulation devices may perform the one or more, or all, functions while not being implemented/deployed as part of a wired and/or wireless communication network (e.g., such as in a testing scenario in a testing laboratory and/or a non-deployed (e.g. testing) wired and/or wireless communication network, and/or testing performed on one or more deployed components of a wired and/or wireless communication network). The one or more emulation devices may be test equipment.

Carrier aggregation was introduced in Release 10 LTE in order to improve system performance. When performing carrier aggregation, rather than connecting to a single LTE cell (e.g., where the LTE cell has a cell bandwidth between 1.4 MHz and 20 MHz), WTRUs configured to perform carrier aggregation according to Release 10 LTE may support up to five serving cells at once (e.g., the terms serving cell and component carrier may be used interchangeably herein), allowing for a maximum aggregated bandwidth of up to 100 MHz. Carrier aggregation is one mechanism available that may be used to increase overall system throughput, increase individual WTRU data rates, and/or allow the network to serve a larger number of WTRUs relatively simultaneously. One of the serving cells may be a primary serving cell (PCell), and the other (e.g., up to four in R10) serving cells may be secondary serving cells (SCells).

The WTRU may receive downlink data using the physical downlink shared channel (PDSCH) and may transmit uplink data on a physical uplink shared channel (PUSCH). A PDSCH may be included on each downlink carrier and a PUSCH may be included on each uplink carrier. The network may dynamically indicate downlink control information (DCI) that includes scheduling information for the PDSCH and/or PUSCH using the physical downlink control channel (PDCCH) and/or the enhanced physical downlink control channel (E-PDCCH). Dynamic scheduling of the PDSCH and/or PUSCH may be performed for each subframe. To receive the PDCCH and/or E-PDCCH, a WTRU may perform blank decoding, during which the WTRU may attempt decode PDCCH and/or E-PDCCH transmission(s) in one or more search spaces with the PDCCH and/or E-PDCCH regions. One or more, or each, search space may include a number of PDCCH or E-PDCCH candidates which the WTRU attempts to decode to determine if the candidate has DCI applicable to the WTRU.

There may be a plurality of (e.g., up to six (6)) PDCCH candidates in the common search space (CSS) in a primary cell. There may be a plurality of (e.g., up to sixteen (16)) candidates of PDCCH and/or E-PDCCH in a WTRU-specific search space (UESS) in one or more activated serving cell. For example, there may be a plurality of (e.g., up to sixteen (16)) candidates of PDCCH and/or E-PDCCH in a WTRU-specific search space (UESS) in each activated serving cell. For one or more candidate in the UESS or CSS, the WTRU may attempt reception. For example, for each candidate in the UESS or CSS, the WTRU may attempt reception. The WTRU may assume that the PDCCH and/or E-PDCCH was transmitted using one or more payload sizes. For example, the WTRU may assume that the PDCCH and/or E-PDCCH was transmitted using one of two or more possible payload sizes. The two or more possible payload sizes may be determined by a set of DCI formats that the WTRU may be configured to receive. One or more, or each, such decoding attempt may be referred to as a "blind decoding attempt." According to Release 10 operation, the number of blind decoding attempts may be 44 for the primary serving cell and 32 for each of the configured and/or activated secondary serving cell(s).

Thus, as the number of carriers being aggregated increases, the number of blind decoding attempts to be performed by the WTRU per-subframe also increases. For example, if WTRU carrier aggregation is enhanced to enable aggregation of a relatively larger number of carriers (e.g., up to 32 carriers), the blind decoding burden at the WTRU could significantly increase if R10 decoding rules are extended across the larger number of carriers. From the perspective of downlink control reception, the enhanced carrier aggregation features may increase the maximum number of blind decoding attempts. For example, the number of blind decoding attempts may increase from 172 for the legacy system with 5 carriers to 1036 for the system with 32 carriers. Such an increase in decoding complexity may result in an unacceptable increase in cost of system hardware. Such an increase in decoding complexity may exceed the desired limits of power consumption.

Further, additional complexities related to the sending of DCI via PDCCH and/or E-PDCCH transmissions for a larger number of carriers may be addressed. For example, higher layers (e.g., radio resource control (RRC)) may configure a number of sets of serving cells for aperiodic channel quality reporting. When sending a aperiodic channel quality request, which set of higher layer configured set of serving cells should be used for generating the channel quality indication (CQI) report may be indicated from the value of an aperiodic channel state information (CSI) field in the DCI (e.g., the value may be 2 bits). However, such a technique may be overly restrictive when a large number of serving cells is configured.

Further, techniques may be described modifying the size of a carrier indicator field (e.g., the Release 10 size of the carrier indicator field may be 3 bits). The size of the carrier indicator field may or may not be sufficient to address a larger plurality of serving cells. For example the size of the carrier indicator field may be insufficient to address up to 32 serving cells when cross-carrier scheduling may be configured. In another example, the current size of an Activation/Deactivation Medium Access Control (MAC) control element (e.g., the Release 10 control element payload size may be 8 bits) may not be ideal for an increased number of available carriers. The size of an Activation/Deactivation MAC control element may or may not be sufficient to address a plurality of serving cells. For example, the size of an Activation/Deactivation MAC control element may be insufficient to address up to 32 serving cells.

The risk of false detection of downlink control information (DCI) may increase as the number of available carriers increases. An increased risk of false detection of DCI may result in one or more of the following issues: excessive unwanted transmissions over PUCCH, spurious transmissions over PUCCH, and/or the like.

One or more techniques may be used to lower the number of blind decoding attempts or otherwise modify downlink control channel processing to allow for reception of a greater number of DCIs to a WTRU, while maintaining scheduler flexibility (e.g., without overly or excessively impairing such flexibility). One or more techniques may be used to lower the number of blind decoding attempts while still supporting an increase in the number of available scheduled shared channel transmissions.

Non-independent PDCCH/E-PDCCH processing may be used. Non-independent PDCCH/E-PDCCH processing may include techniques whereby a first PDCCH/E-PDCCH transmission and/or the location of the first PDCCH/E-PDCCH transmission may either explicitly or implicitly provide a WTRU with information regarding a location of a second PDCCH/E-PDCCH transmission. Non-independent PDCCH/E-PDCCH processing may include techniques whereby a first PDCCH/E-PDCCH transmission and/or the location of the first PDCCH/E-PDCCH transmission may either explicitly or implicitly provide a WTRU with information regarding information used to influence the blind decoding techniques for attempting to receive a second PDCCH/E-PDCCH transmission. The second PDCCH/E-PDCCH transmission may be on a different carrier than the first PDCCH/E-PDCCH transmission. For example, the first PDCCH/E-PDCCH transmission may contain control signaling for a first serving cell and the second PDCCH/E-PDCCH transmission may include control signaling for a second cell. In some examples, a PDCCH/E-PDCCH may contain control signaling for a single cell and in other instances a PDCCH/E-PDCCH may include control signaling for multiple cells. In another examples, a PDCCH/E-PDCCH may contain control signaling for multiple transmissions spread across multiple transmission time intervals (TTIs).

One or more DCI may contain control signaling for multiple carriers or cell and/or control signaling for multiple transmissions spread across multiple transmission time intervals (TTIs). The one or more DCI may be embedded in a PDSCH transmission to a WTRU. A PDCCH/E-PDCCH, for example a single PDCCH/E-PDCCH, may contain control signaling for multiple carriers or TTIs. The single PDCCH/E-PDCCH may include a single DCI that carries control signaling for multiple carriers or TTIs. The single PDCCH/E-PDCCH may include a plurality of DCI that carry control signaling for multiple carriers or TTIs. One or more, or each of the DCI may carry control signaling for a different carrier. The WTRU may determine that the reception of a PDCCH (e.g., a single PDCCH) may schedule PDSCH and/or PUSCH transmissions on resources associated with a plurality of serving cells. Techniques may be used to enable PDSCH and/or PUSCH processing of multiple cells from a PDCCH and/or E-PDCCH. For example, techniques may be used to enable PDSCH and/or PUSCH processing of multiple cells or multiple TTIs from a single PDCCH and/or E-PDCCH.

Grouping of serving cells or TTIs may reduce overhead. The group of serving cells may include a set of serving cells or TTIs configured explicitly or implicitly by higher layers. The configuration related to a serving cell may include a field indicating a group identity. The group identity may be one or more of a configured number of serving cells ordered implicitly, an identified number of serving cells for which a WTRU reports aperiodic CSI in a given value of the aperiodic CSI field, a given value of a carrier indicator field, and/or correspond to certain bit position(s) within an Activation/Deactivation MAC control element.

Techniques are disclosed for ensuring a candidate DCI is valid for the WTRU. Robust techniques for ensuring DCI validity may reduce the probability of a false detection by a WTRU. DCI validity determinations may include ensuring that a received DCI meets one or more criteria. DCI validity determinations may include attempting to decode DCI according to one or more sets of rules.

For example, the criteria for validating a DCI may include verifying the cyclic redundancy check (CRC) parity bits of the DCI. The criteria for validating a DCI may include verifying the CRC parity bits of the DCI after scrambling with the appropriate RNTI. The criteria may include verifying that one or more field of the payload is set to a valid possible value. For example, the criteria may include verifying that every field of the payload is set to a valid possible value. The WTRU may perform one or more actions as a result of detecting a DCI considered valid according to at least a first set of criteria. The WTRU may perform one or more actions as a result of detecting a DCI considered valid according to at least a first set of rules. The rules and/or criteria may be as described herein. If, for example, the WTRU may determine DCI validity based on a first set of criteria and/or a first set of rules, the WTRU may attempt decoding the corresponding PDSCH. For example, if the WTRU may determine DCI validity based on a first set of criteria and/or a first rules, the WTRU may attempt decoding the corresponding PDSCH in case of a DCI indicating a PDSCH transmission. If, for example, the WTRU may determine DCI validity based on at least a second criteria and/or a second rules, the WTRU may attempt decoding the corresponding PDSCH and/or may generate HARQ A/N for the corresponding PDSCH. For example, if the WTRU may determine DCI validity based on at least a second criteria and/or a second rules in addition to the first criteria and/or the first rules, the WTRU may attempt decoding the corresponding PDSCH and/or may generate HARQ A/N for the corresponding PDSCH. For example, if the WTRU may determine DCI validity based on at least a second criteria and/or a second rules exclusive of the first criteria and/or the first rules, the WTRU may attempt decoding the corresponding PDSCH and/or may generate HARQ A/N for the corresponding PDSCH. If, for example, the WTRU may determine DCI validity based on a second set of criteria and/or a second set of rules as described herein, the WTRU may attempt decoding the corresponding PDSCH and/or may generate HARQ A/N for the corresponding PDSCH. For example, if the WTRU may determine DCI validity based on a second set of criteria and/or a second set of rules as described herein in addition to the first criteria and/or the first rules, the WTRU may attempt decoding the corresponding PDSCH and/or may generate HARQ A/N for the corresponding PDSCH. For example, if the WTRU may determine DCI validity based on a second set of criteria and/or a second set of rules as described herein exclusive of the first criteria and/or the first rules, the WTRU may attempt decoding the corresponding PDSCH and/or may generate HARQ A/N for the corresponding PDSCH. If, for example, the WTRU may detect DCI validity based on the first (set of) criteria and/or the first (set of) rules, but the WTRU may not determine DCI validity based on the second (set of) criteria and/or the second (set of) rules, the WTRU may attempt decoding the corresponding PDSCH. For example, if the WTRU may detect DCI validity based on the first (set of) criteria and/or the first (set of) rules, but the WTRU may not determine DCI validity based on the second (set of) criteria and/or the second (set of) rules, the WTRU may attempt decoding the corresponding PDSCH.

Techniques for efficient downlink control with a large number of carriers and/or TTIs are described. Techniques for blind decoding reduction may include making the search space and/or aggregation level of candidates for a first PDCCH/E-PDCCH associated with the characteristics of a second received PDCCH/E-PDCCH. Techniques may include embedding DCI for a set of serving cells and/or TTIs in a PDSCH. DCI for a set of serving cells and/or TTIs may be included in single PDCCH/E-PDCCH. To reduce overhead, carrier indicator field interpretation may be associated with the serving cell or TTI from which the PDCCH/E-PDCCH containing the downlink control information is received, or the group of cells or TTIs to which the PDCCH/E-PDCCH containing the downlink control information belongs.

One or more techniques may be used to lower the number of blind decoding attempts, while maintaining scheduler flexibility (e.g., without overly or excessively impairing such flexibility). One or more techniques may be used to lower the number of blind decoding attempts while still supporting an increase in the number of available component carriers.

Non-independent PDCCH/E-PDCCH processing may be used. Non-independent PDCCH/E-PDCCH processing may include techniques whereby a first PDCCH/E-PDCCH transmission and/or the location of the first PDCCH/E-PDCCH transmission may either explicitly or implicitly provide a WTRU with information regarding a location of a second PDCCH/E-PDCCH transmission. Non-independent PDCCH/E-PDCCH processing may include techniques whereby a first PDCCH/E-PDCCH transmission and/or the location of the first PDCCH/E-PDCCH transmission may either explicitly or implicitly provide a WTRU with information regarding information used to influence the blind decoding techniques for attempting to receive a second PDCCH/E-PDCCH transmission. The second PDCCH/E-PDCCH transmission may be on a different carrier/cell/TTI than the first PDCCH/E-PDCCH transmission. For example, the first PDCCH/E-PDCCH transmission may contain control signaling for a first serving cell and the second PDCCH/E-PDCCH transmission may include control signaling for a second cell. In some examples, one PDCCH/E-PDCCH may contain control signaling for a single cell and in other instances a PDCCH/E-PDCCH may include control signaling for multiple cells. When used herein, the term "PDCCH/E-PDCCH" may be interpreted as the PDCCH and/or E-PDCCH.

In an example, rather than or in addition to different PDCCH/E-PDCCH transmissions including control information for different carriers/cells/TTIs, the PDCCH/E-PDCCH transmission may include control information for different PDSCH and/or PUSCH for different transmission time intervals (TTIs), for example across a single carrier/cell/TTI. Thus, although examples described herein may be described with respect to different PDCCH/E-PDCCH transmissions including scheduling information for transmissions spread across multiple serving cells or component carriers (e.g., in the frequency domain), the examples may also apply to different PDCCH/E-PDCCH transmissions that include scheduling information for transmissions spread across different TTIs (e.g., in the time domain) even if the transmissions in the different TTIs occur on a single serving cell or component carrier.

An example of non-independent PDCCH/E-PDCCH processing may include a decoding rule whereby the set of possible candidates used in a search space of a first serving cell may be dependent on the outcome of PDCCH and/or E-PDCCH decoding of a second serving cell. An example of non-independent PDCCH/E-PDCCH processing may include a decoding rule whereby the set of possible candidates used in a search space of a first TTI may be dependent on the outcome of PDCCH and/or E-PDCCH decoding of a second TTI. For example, the set of possible candidates for a first serving cell may be dependent on one or more of the following features.

An example of non-independent PDCCH/E-PDCCH processing may include having one or more number and/or identity of the PDCCH/E-PDCCH candidates in a first cell/TTI dependent or otherwise chained/linked to the presence or absence of a PDCCH/E-PDCCH in the first serving cell/TTI. The set of possible candidates for a first serving cell may be dependent on the number and/or identity of the PDCCH/E-PDCCH candidates in one serving cell/TTI. The number and/or identity of the PDCCH/E-PDCCH candidates in one serving cell/TTI may be dependent or otherwise chained/linked to the presence or absence of a PDCCH/E-PDCCH in the first serving cell/TTI. The determination of whether the PDCCH is present in the first serving cell may include determining whether or not PDCCH or E-PDCCH was decoded in the second serving cell in one or more search spaces. For example, the WTRU may determine that a UESS of the first serving cell may have zero (0) candidates for decoding based on a decoding result of a second serving cell. For example, the UESS of the first serving cell may have zero (0) candidate if no PDCCH or E-PDCCH was decoded in the UESS of the second serving cell. A WTRU may determine from the location of a DCI in a second cell/TTI that there is a number (x) of PDCCH candidate(s) for the first serving cell. The DCI may be successfully decoded in the UESS of the second serving cell. The location of the DCI may be determined based on the starting control channel element (CCE) of the DCI in the UESS. The location of the DCI may be determined based on the portion of a UESS from which the DCI was decoded. The location of the DCI may be determined based on which UESS search space of a plurality of UESS for a given WTRU were used for decoding the DCI.

An example of non-independent PDCCH/E-PDCCH processing may include having one or more decoding parameters used for PDCCH/E-PDCCH in a first cell/TTI dependent or otherwise chained/linked to the decoding parameters used for of a PDCCH in a second cell/TTI. For example, the decoding parameters of a PDCCH may include determining the aggregation level and/or DCI payload size of a PDCCH and/or E-PDCCH decoded in a second cell. For instance, the aggregation level of candidates in the UESS of the first serving cell may be equal to or otherwise derived from the aggregation level of PDCCH and/or E-PDCCH in a second surviving cell. The DCI payload size of the first serving cell may be equal to the DCI payload size of the second serving cell.

An example of non-independent PDCCH/E-PDCCH processing may include having one or more decoding parameters used for PDCCH/E-PDCCH in a first cell/TTI dependent or otherwise chained/linked to explicit signaling in a PDCCH in a second cell/TTI. The explicit signaling in a PDCCH in a cell may include determining the value of a field in a PDCCH and/or E-PDCCH decoded in a second cell. For example, the aggregation level of candidates in the UESS of the first serving cell may be indicated (e.g., explicitly) from a field of a DCI from a PDCCH and/or E-PDCCH decoded in a second serving cell.

The PDCCH and/or E-PDCCH decoded in a second serving cell/TTI may have one or more of properties that indicate decoding information to be used for attempting to decode the PDCCH and/or E-PDCCH in a second serving cell/TTI. For example, DCI formats used for scheduling in a first serving cell/TTI may be modified or re-interpreted in order to provide the WTRU with information or hints related to the decoding DCI included in the PDCCH and/or E-PDCCH in a second serving cell/TTI.

A new or redefined DCI may comprise control signaling that communicates (e.g., explicitly and/or implicitly) how to reduce decoding complexity. For example, one or more specific DCI formats may be used to explicitly and/or implicitly indicate information used to decode other DCI transmissions. The specific DCI format may be taken from legacy and/or defined for the purpose of search space reduction. For example, the DCI may provide "decoding hints" and/or decoding parameters. To provide decoding parameters, the defined DCI format may contain a field indicating whether a PDCCH/E-PDCCH is present in one or more other serving cells. To provide decoding parameters, the defined DCI format may contain a field indicating whether a PDCCH/E-PDCCH is present in one or more other TTIs. For example, the DCI format may indicate whether or not a PDCCH/E-PDCCH is present on each of the serving cells configured for use by the WTRU. To provide decoding parameters, the defined DCI format may contain a field indicating the aggregation level of PDCCH/E-PDCCH for one or more other serving cells. To provide decoding parameters, the defined DCI format may contain a field indicating the aggregation level of PDCCH/E-PDCCH for one or more other TTIs. For example, the DCI format may indicate the aggregation level of PDCCH/E-PDCCH for each of the serving cells configured for use by the WTRU. The aggregation level of PDCCH/E-PDCCH may be possibly for one or more DCI payload size. For example, the aggregation level of PDCCH/E-PDCCH may be for each possible DCI payload size.

The control signaling that communicates (e.g., explicitly and/or implicitly) how to reduce decoding complexity may explicitly or implicitly indicate to which cells the decoding hints are applicable. For example, the DCI that may provide "decoding hints" and/or decoding parameters may include control signaling such as a sequence of one or more bits. At least one such sequence may be used for one or more cell of a group of one or more cells. For example, at least one such sequence may be used for each cell of a group of one or more cells. For example, the control signaling may be structured using a plurality of the sequences of one or more bits. The sequences may be orderly concatenated. For example, the sequences may be orderly concatenated to increase value of the serving a cell identity associated to an (e.g., each) applicable cell. The cell identity associated to an (e.g., each) applicable cell may be a servCellID configured by L3.

The DCI that may provide "decoding hints" and/or decoding parameters may be applicable to one or more cells and/or one or more TTIs. For example, the DCI may be applicable to an individual cell, a groups of cells, and/or all cells of the WTRU and/or may be applicable one or more TTIs. For example, the group of cells to which DCI is applicable to may include a cell (e.g., at least one of all cells) of the WTRU, all cells of a configured group of cells (e.g., a cell group (CG), if configured with dual connectivity), and cells configured for example by L3/RRC to form the configuration. The cells to which the DCI is applicable to may include activated cells of the WTRU's configuration. For example, the cells to which the DCI is applicable to may comprise activated cells of the WTRU's configuration. The cells to which the DCI is applicable to may include cells that are in the activated state at a specific time. In some examples, the cells to which the DCI is applicable to may include the cells that are in the activated state at a specific time but may not include cells that are not activated and/or deactivated at that time. For example, the cells to which the DCI is applicable to may include cells that are in the activated state at a specific time in the subframe in which the control signaling may be successfully decoded. The cells to which the DCI is applicable to may include cells that are in the activated state at a specific time in the TTI in which the control signaling may be successfully decoded. The cells to which the DCI is applicable to may include cells that are in the activated state at a specific time in a subframe preceding the subframe in which the control signaling may be successfully decoded. The cells to which the DCI is applicable to may include cells that are in the activated state at a specific time in a TTI preceding the TTI in which the control signaling is decoded.

A sequence of bits in a first DCI may be used to indicate what decoding hint/assumption should be used for attempting to decode a second DCI and/or to indicate which serving cell(s) and/or TTI(s) the decoding hint is applicable to. The sequence of bits in the first DCI may include one or more of a Presence flag (P), an Aggregation Level (AL), a size of DCI(s), a Delay Offset (DO), and/or the like.

For example, the sequence of bits in a DCI may include a Presence flag (P). The presence flag may be a bit (e.g., a single bit) that may indicate whether or not a PDCCH is present for the WTRU in another cell. For example, the WTRU may determine whether decoding attempts for a PDCCH in a second cell should be performed based on whether the presence flag in the first DCI of the first cell indicates whether or not the PDCCH is not present.

The sequence of bits in a first DCI that provides decoding hints for a second DCI may include an Aggregation Level (AL). The AL may include one or more bits. For example, one (1) bit may indicate one of two (or possibly more) sets of possible aggregation levels (e.g., 1, 2 or 4, 8) to use for decoding the second DCI. In an example, two (2) bits may indicate the AL (e.g., 1, 2, 4 or 8) for the second DCI in case finer granularity and/or a larger amount of values may be used. The meaning of a field containing an AL may depend on the configuration of the first serving cell. For example, the meaning of a field containing an AL may be a function of the configuration of the first serving cell.

The sequence of bits in a first DCI that provides decoding hints for a second DCI may include a size of one or more other DCI(s). For example, the first DCI may explicitly indicate the size of the second DCI. In an example, the sequence of bits indicating the size of the second DCI may indicate one (or more) sizes from a plurality of possible sizes. A single bit may be used to indicate one two possible sizes for DCI candidates.

The sequence of bits in a first DCI that provides decoding hints for a second DCI may include a Delay Offset (DO). For example, the DO may include timing information for the applicability of the control information. For example, the DO may indicate that the second DCI will be in a subsequent TTI. The DO may be a single bit that may indicate whether the signaling pertains to the current subframe or to the next subframe.

The sequence of bits may be associated with one or more codepoints. The codepoints may combine one or more indicators communicated by the aforementioned sequence of bits. For example, "000" may indicate an absence of PDCCH for a given cell or for a group of cells. "001" may indicate presence of a PDCCH with AL=1, etc.

The WTRU may determine the "first" carriers or TTIs(s) to which the control signaling may be applicable. The "first" carriers or TTIs(s) to which the control signaling may be applicable may be one or more cell of a group of one or more cells. The one or more cell of a group of one or more cells may be a subset of all cells. The "first" carriers or TTIs(s) to which the control signaling may be applicable may be one or more TTI of a group of one or more TTIs. The one or more TTI of a group of one or more TTIs may be a subset of all TTIs. For example, a DCI may contain control signaling for a single group of cells. When the DCI contains control signaling for a single group of cells, the WTRU may determine to what group of one or more cell(s) the control signaling may be applicable. For example, the determination may be based on one or more of the following factors: a cell associated with the PDCCH of the DCI, RNTI that may be used to decode the PDCCH of the DCI, a location of the PDCCH of the DCI, a search space associated with the received DCI, a CRC polynomial used to decode the PDCCH of the DCI, and an indication (e.g. a bitmap) inside the DCI.

The WTRU may determine for what group of one or more cell(s) the control signaling may be applicable based on a cell associated with the PDCCH of the DCI. For example, the cell associated with the PDCCH of the DCI may indicate a same cell or same group of cells. The WTRU may determine that the control signaling is applicable to cell(s) of the same group as the group of the cells on which the WTRU received the PDCCH of the DCI. The WTRU may determine that the received control signaling is applicable to cell(s) that are scheduled by the cell on which the PDCCH is received.

The WTRU may determine to what group of one or more cell(s) the control signaling may be applicable based on RNTI that may be used to decode the PDCCH of the DCI. For example, the WTRU may be configured with a plurality of RNTI(s) (e.g., one for each group of cells). The WTRU may determine that the received control signaling is applicable to one or more cell(s) (e.g., a group of cells) as a function of the RNTI that may be used to successfully decode the PDCCH.

The WTRU may determine to what group of one or more cell(s) the control signaling may be applicable based on the location of the PDCCH of the DCI (e.g., in the UESS, in the CSS, etc.). For example, the WTRU may determine that the control signaling is applicable to one or more cell(s) (e.g. a group of cells) as a function of a control channel element (CCE) of the DCI. The CCE of the DCI may be the first CCE for the received DCI. For example, CCEs may be organized using a numerological sequence (e.g., where the first CCE of a SS is #0, the second CCE corresponds to #2, etc.). The WTRU may determine that the received control signaling is applicable to the group of cells associated with the numerological value (or range thereof) corresponding to the first CCE of the DCI. The WTRU may determine that the received control signaling is applicable to the group of cells associated with the range of numerological value corresponding to the first CCE of the DCI. The WTRU may determine that odd indices may indicate a first group of cells. The WTRU may determine that even indices may indicate a second group of cells.

The WTRU may determine for what group of one or more cell(s) the control signaling may be applicable based on the search space associated with the received DCI. For example, the WTRU may determine that the control signaling is applicable to one or more cell(s) (e.g., a group of cells) as a function of the search space of the DCI that carries the control signaling. The WTRU may determine that the received control signaling may apply to decoding in the same search space for the one or more cells to which the control signaling is applicable. For example, the control signaling may be applicable to the one or more cells as a function of the search space of the received DCI. The search space may be used, for example, by CSS or UESS, and the received DCI may be associated with the CSS or UESS respectively. For example, the WTRU may determine that the received control signaling applies to a specific group of cells associated with a given UESS or a portion of the UESS when the WTRU determines that the DCI is received in the concerned UESS.

The WTRU may determine for what group of one or more cell(s) the control signaling may be applicable based on the CRC polynomial that may be used to decode the PDCCH of the DCI. For example, the WTRU may be configured with one or more CRC polynomials. The one or more CRC polynomials may include the number of bits in the DCI applicable for the CRC computation. The one or more CRC polynomials may be associated with a specific DCI type. The WTRU may perform additional decoding attempt(s) of a DCI of a specific size using the polynomials and/or the corresponding number of bits (e.g., the last 16 bits). The WTRU may determine that the DCI is a format that includes the control signaling. For example, the WTRU may determine that the DCI is a format that includes the control signaling (e.g. decoding hints) upon successful decoding. The control signaling ma The one or more CRC polynomials y include decoding hints. The polynomial may be associated with a group of cell(s). The WTRU may determine that the control signaling is applicable to the corresponding group of cell(s). For example, the WTRU may use the concerned polynomial and determine that the control signaling is applicable to the corresponding group of cell(s), upon successful decoding of the PDCCH.

The WTRU may determine to what group of one or more cell(s) the control signaling may be applicable based on an indication (e.g., a bitmap) inside the DCI. For example, the WTRU may determine that the control signaling is applicable to one or more cell(s) (e.g. a group of cells) as a function of an indication inside a bitmap arrangement in the DCI.

One or more DCI may contain control signaling for multiple carriers/cells and/or multiple TTIs. The one or more DCI may be embedded in a PDSCH transmission to a WTRU. A PDCCH/E-PDCCH, for example a single PDCCH/E-PDCCH, may contain control signaling for multiple carriers/cells and/or multiple TTIs. The single PDCCH/E-PDCCH may include a single DCI that carries control signaling for multiple carriers/cells and/or multiple TTIs. The single PDCCH/E-PDCCH may include a plurality of DCI that carry control signaling for multiple carriers/cells and/or multiple TTIs. One or more of the DCI may carry control signaling for a different carrier/cell/TTI. For example, each of the DCI may carry control signaling for a different carrier/cell/TTI. The WTRU may determine that the reception of a PDCCH (e.g., a single PDCCH) may schedule PDSCH and/or PUSCH transmissions on resources associated with a plurality of serving cells of the WTRU's configuration. Techniques may be used to enable PDSCH and/or PUSCH processing of multiple cells from a PDCCH and/or E-PDCCH. For example, techniques may be used to enable PDSCH and/or PUSCH processing of multiple cells from a single PDCCH and/or E-PDCCH.

Techniques used to enable PDSCH and/or PUSCH processing of multiple carriers/cells/TTIs from a single PDCCH and/or E-PDCCH may include embedded DCI for multiple carriers/cells/TTIs. An embedded DCI may refer to a DCI that is included in or embedded in a PDSCH transmission. A DCI may be transmitted inside RBs used for a PDSCH transmission to a WTRU in a given subframe. One or more DCI messages may be contained in the RBs used for PDSCH. DCI messages contained inside RBs used for PDSCH transmission to a WTRU may refer to the same subframe and/or another, for example later occurring subframe. DCI transmitted inside RBs used for a PDSCH transmission may be destined for the WTRU that is the intended receiver of data or control information in the PDSCH. DCI transmitted inside RBs used for a PDSCH transmission may be destined for another WTRU that is not the intended receiver of the PDSCH transmission. In scenarios in which multiple DCIs may be transmitted in RBs used for PDSCH transmission in any of the aforementioned techniques, these multiple DCI messages may be separately processed/mapped to time/frequency resources. In scenarios in which multiple DCIs may be transmitted in RBs used for PDSCH transmission in any of the aforementioned techniques, these multiple DCI messages may be concatenated/jointly channel coded.

An embedded DCI for multiple carriers/cells/TTIs may be multiplexed with the Transport Channel bits prior to mapping of the modulation symbols to time/frequency resources.

For example, a DCI may be multiplexed with the Transport Channel bits prior to mapping of the modulation symbols to time/frequency resources when transmitted in resource blocks (RBs) that may be used for PDSCH transmission. A concatenated string of bits obtained from transport block (TB) bits and/or DCI bits may be processed by the transmitter. For example, a CRC for an N bit TB containing data and/or a CRC for an M bit DCI containing control information may be separately determined. One part, or both parts, may be separately channel coded. One part, or both parts, may be separately channel coded using Turbo coding for the TB and/or Convolutional Coding for the DCI. One, or both, channel coded segments may be concatenated, interleaved, processed, and/or mapped to PDSCH time/frequency resources in a subframe for transmission. A receiving WTRU may determine modulation and coding scheme (MCS), TB size, and/or RB allocation from a DCI announcing the PDSCH. The receiving WTRU may process the received RBs. For example, the receiving WTRU may process the received RBs according to a first hypothesis that DCI is contained in the PDSCH. The receiving WTRU may process the received RBs according to a second hypothesis that no such DCI is present.

An embedded DCI for multiple carriers/cells/TTIs may be multiplexed with PDSCH onto a set of determined modulation symbols and/or channel coded bit positions in the set of time/frequency resources used for PDSCH. For example, a DCI may be multiplexed with PDSCH when transmitted in RBs that may be used for PDSCH transmission. DCI and/or PDSCH may be separately processed based on one or more of CRC, channel coding, rate-matching, and/or the like. Channel coded DCI bits may be mapped to a set of resource elements (REs) that may be part of the RBs used for PDSCH. PDSCH mapping may or may not be adjusted accordingly in terms of rate-matching.

An embedded DCI for multiple carriers/cells/TTIs may be mapped starting from possible starting symbol and/or bit positions. For example, a DCI may be mapped starting from possible starting symbol and/or bit positions when transmitted in RBs that may be used for PDSCH transmission. The starting symbol and/or bit positions may be fixed values and/or sets of values. The starting symbol and/or bit positions may be obtained from a function that may involve varying parameters. The varying parameter may be one or more of Cell ID, WTRU ID, subframe or timeslot index, RB number, component carrier number for which the DCI may be intended, and/or the like. A set of potentially different starting positions may be allowed, for example if multiple DCIs are transmitted, among other scenarios.

An indication may be transmitted to a WTRU. The indication may allow the WTRU to determine that an embedded DCI for multiple carriers/cells/TTIs is transmitted in RBs used for PDSCH. The indication may refer to a determined set of RBs (e.g., only such RBs). The indication may refer to a set of candidate RBs. The indication may refer to one or more, or all, RBs containing channel coded data in a subframe. The indication may refer to a given subframe. The indication may refer to a given TTI.

For example, the DCI on PDCCH and/or EPDCCH announcing the PDSCH may contain an indication in the form of a bit flag and/or a codepoint setting that DCI is contained in the announced PDSCH. This may allow the WTRU to configure its receiver accordingly and/or start PDSCH decoding.

For example, a sequence of phase value of time/frequency symbols may be adjusted to carry an indication for DCI transmitted in RBs that may be used for PDSCH. The time/frequency symbols used for indicating the phase value may be known to the WTRU. A WTRU may determine that the DMRS symbols of RBs it is demodulating indicates a first configuration. A WTRU may configure its receiver to decode for presence of PDSCH. The WTRU may configure it receiver to decode for presence of DCI and/or PDSCH. For example, the WTRU may configure it receiver to decode for presence of DCI and/or PDSCH when the WTRU determines a second configuration through the DMRS symbols. Different phase values and/or code settings may be used for the DMRS based indication.

A WTRU may implement a detection procedure. Through the detection procedure, the WTRU may determine for a set of RBs whether a DCI is present or not. The RBs may be used by the PDSCH transmission. The WTRU may or may not be an intended WTRU for the PDSCH transmission. The WTRU may implement the detection procedure, when the DCI may be destined for the same WTRU for which the PDSCH is intended. The WTRU may implement the detection procedure, when the DCI may be destined for a second WTRU (e.g., the DCI is included in a PDSCH transmission sent to another WTRU).

For example, when DCI is transmitted in RBs used for PDSCH, the possible starting symbol and/or bit positions may correspond to a deterministic set. In a given subframe, a WTRU may demodulate and/or determine for one or more possible starting position whether the DCI is detected. For example, the WTRU may demodulate and/or determine for each of a set of possible starting positions whether DCI is detected. Where the DCI may be detected, the WTRU may configure its receiver according to the received DCI. The DCI transmitted in RBs used for PDSCH may be encoded in a way that is directed to intended receiving WTRUs. For example, the DCI may be encoded in a way that intended receiver WTRUs may correctly decode the DCI but the DCI is not decodable by WTRUs for which the DCI is not intended. An example may be that CRC may be masked with WTRU RNTI values. DCI may be encoded such that any receiver WTRU may determine correct detection, yet may still discard and/or further process the received DCI by determining an identifier from the DCI.

A WTRU may determine outcomes of DCI processing for the embedded DCI for multiple carriers/cells/TTIs. For example, a WTRU may determine outcomes of DCI processing when a DCI is transmitted in RBs used for PDSCH transmission. The WTRU may further process and/or generate feedback to the transmitter (e.g., eNB) based on the outcomes of the DCI decoding. Feedback may correspond to Ack/Nack feedback, channel measurements, counters, and/or reportable error statistics and/or representative error statistics. Channel measurements may include signal-to-noise ratio (SNR) and/or derived values.

The WTRU may generate, store, and/or report statistics related to the success/failure of receiving DCI in the PDSCH (and/or on a downlink control channel). Outcomes of DCI processing for DCI transmitted in RBs may be processed and/or recorded in one or more of the following statistics: decoding successful, decoding not successful, number of correct decodes over a period, number of no decodes over a period, the signal-to-noise ratio (or equivalent or indexed as a function thereof) for symbols, and/or bit positions where DCI may be contained.

Link adaptation may be implemented on the transmitter side, perhaps for example in the presence of feedback on performance for DCI transmitted in RBs used for PDSCH. For example, a transmitter may decrease the coding rate for DCI in the presence of feedback on performance for DCI transmitted in RBs used for PDSCH. The decreased coding rate for DCI may allow for more robust transmissions. For example, when a WTRU reports multiple decoding and/or missed detection events, the decreased coding rate may allow for more robust transmissions. Another exemplar link adaption is that the transmitter may chose smaller DCI sizes to improve upon link robustness.

For example, a WTRU configured to decode for presence of DCI transmitted in RBs used for its PDSCH transmissions may report to the eNB the number of DCI that it was able to successfully decode. The WTRU may report to the eNB at regular time intervals. The WTRU may report to the eNB when polled by the eNB about the number of successful decoded DCI. The eNB may know the number of DCI that it transmitted to that WTRU. The eNB may determine a DCI error rate from the reported value. The eNB may adjust link settings.

Techniques used to enable PDSCH and/or PUSCH processing of multiple carriers/cells/TTIs from a single PDCCH and/or E-PDCCH may include a single DCI or a plurality of DCIs in a PDCCH and/or E-PDCCH. A single DCI or a plurality of DCIs in a PDCCH and/or E-PDCCH (may referred to PDCCH in some examples hereafter, but these examples may also apply to the E-PDCCH) may provide scheduling information for multiple serving cells or TTIs. A WTRU may receive PDCCH and/or E-PDCCH containing scheduling information for a plurality of cells or a plurality of TTIs. For example, a single PDCCH and/or E-PDCCH may contain scheduling information for a plurality of cells or a plurality of TTIs. The single PDCCH and/or E-PDCCH may contain one DCI comprising scheduling information for a plurality of cells or a plurality of TTIs. The single PDCCH and/or E-PDCCH may contain a plurality of DCIs. For example, each one of the plurality of the DCI may contain scheduling information for a different cell or TTI.

DCI contained in a PDCCH for multiple cells or TTIs may include using a single DCI for multiple cells or TTIs. The WTRU may receive a PDCCH that may include scheduling information applicable to transmissions associated to a plurality of cells of the WTRU's configuration. The PDCCH may include a single DCI. The transmissions may be a downlink transmission received on PDSCH and/or an uplink transmission on PUSCH. DCI may indicate scheduling information for a plurality of transport blocks. DCI may indicate scheduling information for a transport block which spans over the plurality of cells or TTIs.

For example, a single DCI may correspond to multiple TBs. One or more of the multiple TBs may be associated with a different cell or TTI. For example, the WTRU may determine that a DCI indicates scheduling information for a plurality of transport blocks (TBs), and each TB may be associated with a different cell or TTI. The WTRU may determine transmission parameters for one or more TBs. For example, the WTRU may determine the transmission parameters for each of the TBs. How the transmission parameters are granted or assigned to the TBs may vary.

How the transmission parameters are granted or assigned to the TBs may be that the DCI may grant or assign same and valid scheduling parameters to one or more TBs. For example, each TB associated with a cell or a TTI may be granted the same scheduling parameters. The DCI may include a set of scheduling parameters. The scheduling parameters may comprise one or more of PRBs, MCS, redundancy version (RV), hybrid automatic repeat request (HARQ) process ID, and/or the like. The scheduling parameters may be common to each of the cells and/or TTIs being scheduled or separate sets of scheduling parameters may be provided for each cell and/or TTI being scheduled. For example, the DCI may include a single set of scheduling parameters. The WTRU may use the same set of parameters for one or more different cells. For example, the WTRU may use the same set of parameters for all TBs. Some or all of the scheduling parameters may translate into different sets of transmission parameters. For example, the number of PRBs may additionally be a function of the bandwidth of the concerned cell.

For example, the DCI may grant or assign one or more different set of scheduling parameters to one or more TBs. For example, each TB associated with a cell or a TTI may be granted one or more different set of scheduling parameters.

The DCI may include additional scheduling information. For example, the DCI may include the list of applicable cells or applicable TTIs. The DCI may include the list of applicable cells or applicable TTIs using a bitmap for a group of cells or a group of TTIs. The list may identify the one or more secondary carriers/cells/TTIs. For example, the list may identify the secondary cells or TTIs when the WTRU may not explicitly or implicitly determine the applicable cells using other techniques described herein. For example, the DCI may include alternative values for one or more of PRB, MCS, RV, and/or a HARQ process identity for one or more of the second cells or TTIs.

How the transmission parameters are granted or assigned to the TBs may be that the DCI may grant or assign same and valid scheduling parameters to a single TB. A single transmission (e.g., a single TB) may spread across resources that may be associated with one or more carriers/cells/TTIs. For example, a single DCI may correspond to a single TB spanning across different cells and/or spanning across multiple TTIs. The WTRU may determine that a DCI indicates scheduling information for a single TB. The TB may be transmitted on one or more different sets of physical resources (e.g., physical resources blocks (PRBs)). One or more set of physical resources may be associated with different serving cells or different TTIs. For example, each set of physical resources may be associated with different serving cells or different TTIs. The WTRU may determine that the TB may be transmitted on different and/or disjoint sets of PRBs.

A TB may be mapped to PDSCH and/or PUSCH in one or more serving cells or TTIs. Modulated symbols for the transport block may be mapped to resource elements from the one or more serving cells or TTIs.

For example, the WTRU may determine the transmission parameters for the single TB according to one or more of the following techniques.

The one or more techniques may include an example of procedure where the DCI may include a single set of scheduling parameters (e.g., PRBs, MCS, RV, and/or HARQ process ID, etc.). The WTRU may use the parameters similar to legacy, perhaps except for the PRB. The WTRU may determine one or more different sets of PRBs associated with one or more cells. For example, the WTRU may determine one or more different sets of PRBs associated with each cell. The WTRU may determine one or more different sets of PRBs associated with one or more cells by applying the parameter independently for one or more cells. The WTRU may determine one or more different sets of PRBs associated with one or more cells by applying the parameter independently for each cell. The WTRU may consider the sum of one or more PRBs. For example, the WTRU may consider the sum of all PRBs. The WTRU may derive the TB size using similar methods as for legacy methods. The parameters related to the PRBs may translate into one or more different sets of transmission parameters. For example, the number of PRBs may additionally be a function of the bandwidth of the concerned cell or TTI.

The DCI may include one or more different sets of scheduling parameters (e.g. PRBs, MCS, RV, and/or HARQ process ID, etc.) for one or more transmission parameters. For example, the DCI main include signaling for PRBs independently for one or more applicable cell. For example, the DCI main include signaling for PRBs independently for each applicable cell.

Techniques used to enable PDSCH and/or PUSCH processing of multiple cells from a single PDCCH and/or E-PDCCH may include using a plurality of DCIs and transmissions for multiple cells or TTIs. DCI contained in a PDCCH for multiple cells or TTIs may include using a plurality of DCIs and transmissions for multiple cells or TTIs. The multiple DCIs may be separately and/or jointly encoded in a given PDCCH and/or E-PDCCH transmission. For example, the WTRU may receive a PDCCH that may include scheduling information applicable to transmissions associated with a plurality of cells or TTIs of the WTRU's configuration. The PDCCH may include a plurality of DCIs.

A plurality of DCI may correspond to multiple TBs. One or more TB may be in different cells/TTIs. For example, each TB may be in a different cell or TTI. The WTRU may determine that a PDCCH may include a plurality of DCIs. One or more DCI may include scheduling information for transmissions associated with a different cell of the WTRU's configuration. For example, each DCI may include scheduling information for transmissions associated with a different cell of the WTRU's configuration. The PDCCH may include cross-carrier scheduling information in order to indicate which cells the DCI is applicable to. The PDCCH and/or E-PDCCH may include cross-TTI scheduling information in order to indicate which TTIS the scheduling information is applicable to. The PDCCH may include a single CRC. For example, the PDCCH may include a single CRC appended after the plurality of DCIs. PDCCH decoding may be performed on the concatenation of the plurality of DCIs.

For one or more of the techniques described herein, the control signaling and/or parameters associated with a given cell or TTI of the WTRU's configuration may be present. For example, for one or more of the techniques described herein, the control signaling and/or parameters associated with a given cell or TTI of the WTRU's configuration may be present in the absence of a transmission using resources of a cell or TTI. The cell may be the concerned cell and/or group of cell(s) if applicable. The TTI may be the concerned TTI and/or group of TTI(s) if applicable. The WTRU may determine that the control signaling and/or parameters associated with a given cell or TTI of the WTRU's configuration may be present when it receives a PDCCH according to a one or more of the following scenarios. In one of the scenarios, the WTRU may determine that the signaling indicates that the resources of the cell (DL and/or UL) are not being scheduled by the concerned PDCCH. The signaling, if any, may be used to indicate whether or not the PDCCH is applicable to a specific cell, for example using a bitmap. In one of the scenarios, the control signaling and/or parameters associated to a given cell of the WTRU's configuration may be present. The WTRU may determine that the cell is in the inactive state. This scenario may be applicable to scheduling for downlink transmissions and/or uplink transmissions for the associated cell. In one of the scenarios, the control signaling and/or parameters associated to a given cell of the WTRU's configuration may be present. The WTRU may determine that the cell may not be uplink time-aligned. This scenario may be applicable to scheduling for uplink transmissions for the associated cell, for example only for the associated cell. In one of the scenarios, the control signaling and/or parameters associated to a given cell of the WTRU's configuration may be present. The WTRU may determine that control signaling is received. Control signaling may further indicate for what transmissions (and/or cell(s)) the WTRU may be expected to generate a HARQ A/N report. The WTRU may determine that no HARQ A/N report might be expected for a given cell, such that it may additionally determine that no (e.g., downlink only) transmission is being scheduled for the concerned cell. In one of the scenarios, the control signaling and/or parameters associated to a given cell of the WTRU's configuration may be present. The WTRU may determine that cell-specific transmission parameters for the concerned cell(s) may be absent and/or set to a specific value (e.g. zeroed). In one of the scenarios, the control signaling and/or parameters associated to a given cell of the WTRU's configuration may be present, in any combination of the aforementioned scenarios where scheduling information for uplink and/or downlink transmissions and/or for a plurality of cells may be available or provided.

Techniques used to enable PDSCH and/or PUSCH processing of multiple carriers/cells/TTIs from a single PDCCH and/or E-PDCCH may comprise compressing resource allocation information for multiple carriers/cells/TTIs. For example, certain subsets of fields in DCI information may include differentiated information for multiple cells and/or DCIs and other cells may include common information. For example, the resource allocation information may indicate separate information for each cell and/or TTI being scheduled and other fields such as MCS may be common across the multiple cells being scheduled. The fields that include differentiated information for multiple cells may be jointly encoded or otherwise compressed in order to reduce the number of bits used. Resource allocation information may be compressed for one or more carriers/cells/TTIs. For example, resource allocation information may be compressed for multiple serving cells or multiple TTIs. Compressing resource allocation information may be achieved through one or more of the following techniques: one or more fields from one or more DCIs of a PDCCH and/or E-PDCCH may contain the resource allocation information for PDSCH and/or PUSCH; a pre-defined set of RBs may be assigned to the multiple serving cells or TTIs; and a subset of cells or TTIs may be identified and mapped to a pre-defined sets of RBs or a sets of RBs configured by higher layers.

The WTRU may determine resource allocation information for PDSCH and/or PUSCH in one or more cells or TTIs from at least one field that may be received in one or more DCIs of a PDCCH and/or E-PDCCH. The WTRU may determine resource allocation information for PDSCH and/or PUSCH in a plurality of cells or TTIs from at least one field that may be received in one or more DCI's of a PDCCH and/or E-PDCCH. The combined size of the at least one field may be reduced. For example, the combined size of the at least one field may be significantly reduced, comparing with a size of field through the reuse of existing techniques. The existing techniques may allocate portions of resources on a per-cell basis. Downlink control overhead may be minimized through the reduction of combined size of field. It may or may not be useful or efficient for the network to allocate portions of resources over multiple cells when a large number of carriers/cells/TTIs may be aggregated.

The WTRU may determine that at least one of pre-defined sets of RB's may be allocated for at least one cell. For example, the WTRU may determine that at least one of pre-defined sets of RB's may be allocated for at least one cell based on an indication of the at least one cell. A pre-defined set of RB's may comprise all RBs of the cell, no (zero) RB, and/or a subset of RBs configured by higher layers. The DCI may then indicate that the pre-defined sets of RBs (e.g., one of a set of potential predefined RB allocations) has been allocated for the WTRU using reduced size signaling (e.g., rather than a full sized legacy DIC format). For example, the subset of RBs configured by higher layers may be on a per cell basis. Signaling overhead may be reduced for resource allocation when, for a subset of cells or TTIs, a few bits may be used to indicate the pre-defined resource (e.g., rather than including the full scheduling information in the DCI). Indicating a detailed RB allocation for each cell or TTI scheduled by the PDCCH and/or E-PDCCH may require >~20 bits while referring to predefined allocations may be performed using just a few bits.

The WTRU may determine a set of cells or TTIs for which a pre-defined set of RBs may be allocated for one or more cells or TTIs based on at least one field received in the DCI. The WTRU may determine a set of cells or TTIs for which a pre-defined set of RB's may be allocated for each of the cells or TTIs based on at least one field received in the DCI. The WTRU may determine a set of cells which pre-defined set of RB's may be used for one or more cells, based on at least one field received in the DCI. The WTRU may determine a set of cells which pre-defined set of RB's may be used for each of the cells based on at least one field received in the DCI. For example, one field may indicate for one or more cell or TTI whether and/or which one of the pre-defined sets of RB's may be allocated for the cell or TTI. One field may indicate for each cell or TTI whether and/or which one of the pre-defined sets of RB's may be allocated for the cell. For instance, if two bits are used for each cell in this field, one out of a number of four possible values may indicate that a detailed RB allocation (e.g., as in existing system) may be provided for the cell (e.g., in a subsequent field). The three other values may each indicate one of the set of pre-defined set of RBs.

For example, a first field may indicate the subset of cells or TTIs for which a pre-defined set of RBs may be allocated. A first field may indicate the subset of cells or TTIs for which a detailed RB allocation may be provided. One or more possible value of the first field may correspond to a subset of cells or cell groups. The subset of cells may comprise a single cell. For example, each possible value of the first field may correspond to a subset of cells or cell groups. A value of the first field and a subset of cells may be mapped. The mapping may be configured by higher layers. The mapping may be pre-defined. A second field may indicate for one or more subsets of cells indicated in the first field, which of the set of pre-defined RB's may be allocated. A second field may indicate, for each subset of cells indicated in the first field, which of the set of pre-defined RB's may be allocated. For example, the technique discussed herein may be used when two sets of pre-defined RB's may be pre-defined. The second field may use one bit per cell (perhaps e.g., only one bit per cell) indicated in the first field.

The WTRU may determine the subset of RBs for at least one cell based on at least one RB assignment field. For example, the WTRU may determine the subset of RBs for the at least one cell based on at least one RB assignment field if the WTRU determines that a pre-defined set of RBs is not allocated for the at least one cell. One or more assignment field may indicate a subset of RBs for at least one cell. For example, each RB assignment field may indicate a subset of RBs for at least one cell. The order of the RB assignment fields may be based on a cell index and/or cell identity among the subset of cells for which a pre-defined set of RB's might not be allocated. The order of the RB assignment fields may be based on a cell index and/or cell identity among the subset of cells for which a pre-defined set of RB's may not be allocated. One or more assignment field may indicate a subset of RBs across more than one cell or TTI. Each RB assignment field may indicate a subset of RBs across more than one cell or TTI. For example, the field may be interpreted such that a bandwidth corresponds to the sum of the bandwidths of the more than one cell or TTI.

For example, a PDCCH/E-PDCCH may schedule PDSCH and/or PUSCH for four (4) cells. There may be two (2) pre-defined sets of RB's: "No RB" and "All RB's". In every assignment, three (3) out of the 4 cells or TTIs may be allocated one (1) of the pre-defined sets. One (1) cell or TTI may be allocated according to a RB assignment field.

In such scenario, the set of fields for the RB allocation of all cells may include the following: one 2-bit field, one 3-bit field, one RB allocation field, and padding bits. The 2-bit field may indicate which 3 out of the 4 cells may be allocated a pre-defined set of RBs. For example, "00", "01", "10" and "11" may indicate that cells (2,3,4), (1,3,4), (1,2,4) and (1,2,3) are allocated a pre-defined set of RB's respectively, and correspondingly that cell 1, 2, 3 or 4 respectively may be allocated according to a RB assignment field.

The set of fields for the RB allocation of all cells may include one 3-bit field. The 3-bit field may indicate, for each of the 3 cells that are allocated a pre-defined set of RBs, if the pre-defined set is "No RB" or "All RB's".

The set of fields for the RB allocation of all cells may include at least one RB allocation field for the 1 cell that is not allocated a pre-defined set of RB. The size of this field may correspond to the number of RB's (e.g., carrier bandwidth) for the cell.

The set of fields for the RB allocation of all cells may include padding bits. The padding bits may ensure that the total number of bits for the aforementioned fields may be set to a known value.

Techniques used to enable PDSCH and/or PUSCH processing of multiple carriers/cells/TTIs from a single PDCCH and/or E-PDCCH may comprise one or more ways in which a WTRU decodes the PDCCH that contains the control signaling described herein. For example, the WTRU may determine that a PDCCH contains any of the control signaling described herein (e.g. a PDCCH format/type and/or a DCI format/type) using differentiation methods similar to those described herein for the reception of the control information.

The WTRU may determine the type of the PDCCH (and/or DCI) as a function of one or more factors described herein, including a configuration aspect. For example, the WTRU may determine whether or not the control signaling may occur on the PDCCH of a given cell, perhaps if the WTRU is configured with the functionality.

The WTRU may determine the type of the PDCCH (and/or DCI) as a function of a RNTI used to decode a PDCCH. For example, the WTRU may determine that the control signaling is included in the PDCCH as a function of the RNTI used to successfully decode the PDCCH candidate. For example, the WTRU may be configured with a specific RNTI value for the techniques.

The WTRU may determine the type of the PDCCH (and/or DCI) as a function of a location of the PDCCH in the search space. For example, the WTRU may determine from the location (e.g. starting CCE of the DCI in a specific range and/or in a specific search space and/or portion thereof) that the control signaling is included in the PDCCH.

The WTRU may determine the type of the PDCCH (and/or DCI) as a function of a search space. For example, the WTRU may determine that the control signaling is included in the PDCCH as a function of the search space in which the PDCCH is decoded. For example, the WTRU may determine that any PDCCH receive in a specific search space may include the control signaling, but in some embodiments perhaps not in another search space.

The WTRU may determine the type of the PDCCH (and/or DCI) as a function of a CRC polynomial. For example, the WTRU may determine that the control signaling is included in the PDCCH as a function of a CRC polynomial that may be used to determine the format and/or contents of the PDCCH.

Techniques used to enable PDSCH and/or PUSCH processing of multiple carriers/cells/TTIs from a single PDCCH and/or E-PDCCH may comprise one or more ways in which a WTRU determines the carriers/cells/TTIs to which the control signaling discussed herein is applicable. For example, the WTRU may determine that the control signaling is applicable to one cell or to a plurality of cells applicable using methods similar as for the reception of the control information described herein. The plurality of cells may correspond to a group of cells.

For example, the WTRU may determine the applicable cell(s) as a function of one or more of: an identity of the cell(s) inside the DCI, a cross-carrier scheduling association with the cell on which the PDCCH is received, the RNTI used to decode the PDCCH of the DCI, the location of the PDCCH of the DCI, the search space associated with the received DCI, and/or a CRC polynomial used to decode the PDCCH of the DCI, and/or using an indication (e.g. a bitmap) inside the received PDCCH.

Grouping of serving cells or TTIs may reduce overhead. PDCCH/E-PDCCH or MAC signaling may incur overhead. A WTRU may use a concept of a group of serving cells and interpret the values of certain fields based on the group of serving cells or TTIs that is related to the PDCCH/E-PDCCH or MAC signaling. (e.g., as a function of the group of serving cells or TTIs) The group of serving cells or TTIs may include a set of serving cells or TTIs configured explicitly or implicitly by higher layers. The group may be a pre-defined or configured number of serving cells per group. The order of groups may be implicitly defined from the order of the configuration of serving cells or TTIs. For example, if the number of serving cells per group is defined to be 8, a first group may include the first 8 configured serving cells, and a second group may include the 8 following configured serving cells, and so on. For example, the configuration related to a serving cell or TTI may include a field indicating a group identity. The group identity may be one or more of a configured number of serving cells ordered implicitly, an identified number of serving cells for which a WTRU reports aperiodic CSI in a given value of the aperiodic CSI field, a given value of a carrier indication field, a certain bit position within an Activation/Deactivation MAC control element, and/or the like The group identity may be associated with aperiodic CSI triggering. The set of serving cells for which the WTRU may report aperiodic CSI in PUSCH for a given value of the aperiodic CSI field may be determined from a combination of higher layer signaling and/or one or more of the following. The set of serving cells may be determined from a combination of higher layer signaling and/or the serving cell from which the PDCCH/E-PDCCH containing the UL grant may be received, or the group of serving cells to which it belongs. The set of serving cells may be determined from a combination of higher layer signaling and/or the group of serving cells to which the serving cell from which the PDCCH/E-PDCCH containing the UL grant belongs. The set of serving cells may be determined from a combination of higher layer signaling and/or the serving cell of the PUSCH transmission containing the aperiodic CSI report. The set of serving cells may be determined from a combination of higher layer signaling and/or the group of serving cells to which the serving cell of the PUSCH transmission containing the aperiodic CSI report belongs.

For example, the WTRU may report CSI for a first set of serving cells configured by higher layers when the value of the aperiodic CSI field is set to "11" and/or the PUSCH is for a serving cell that is part of a first group of serving cells. The WTRU may report CSI for a second set of serving cells configured by higher layers when the value of the aperiodic CSI field is set to "11" and/or the PUSCH is for a serving cell that is part of a second group of serving cells. In this example, the WTRU may be allowed to transmit CSI over more than one PUSCH.

In another example, the WTRU may report CSI for a first set of serving cells configured by higher layers when the value of the aperiodic CST field is set to "11" and/or the PDCCH/E-PDCCH may be received from a serving cell that is part of a first group of serving cells. The WTRU may report CSI for a second set of serving cells configured by higher layers when the value of the aperiodic CSI field is set to "11" and/or the PDCCH/E-PDCCH may be received from a serving cell that is part of a second group of serving cells.

In some example, the WTRU may implement such techniques without being configured with multiple serving cells in the uplink.

The group identity may be defined such that the carrier indicator field (CIF) interpretation may be dependent on a serving cell over which the PDCCH/E-PDCCH was received. For example, the WTRU may receive a DCI via a first "scheduling cell" (e.g., scheduling cell may refer to the cell over which the PDCCH/E-PDCCH/DCI was received). The DCI may include a carrier indicator field that indicates an index value. For example, the CIF may be three bits, meaning that it could distinctly refer to up to eight different "scheduled cells" (e.g., the scheduled cell may refer to the cell over which the PDSCH/PUSCH transmission is to be performed). By basing the interpretation of the CIF on the identity of the scheduling cell over which the DCI was received, more than eight cells can be referred to using the same 3-bit indication/CIF in the DCI. For example, if the WTRU monitors two scheduling cells that are each associated with different interpretations of the CIF, the scheduled cell could be one of 16 different serving cells. Thus, by associating the interpretation of the value of the CIF with the identity of the scheduling cell the DCI was received from, larger number of serving cells may be scheduled while maintaining one or more legacy DCI formats.

The association of the CIF interpretation with the scheduling serving cell (e.g., a dependency of the CIF interpretation on the scheduling serving cell) may be realized, for example, based on defining serving cell groups. For example, the if the scheduling serving cell is a member of the first group, then the CIF may be interpreted to be referring to one or more of the scheduled cells of the first group. If the scheduling serving cell is a member of a second group, then the CIF may be interpreted to be referring to one or more scheduled cells of the second group.

The association of the CIF interpretation with the scheduling serving cell (e.g., a dependency of the CIF interpretation on the scheduling serving cell) may be realized, for example, by configuring for each scheduled serving cell a value of the CIF used to refer to the scheduled serving cell and/or by configuring the scheduling cell(s) from which the scheduled serving cell will be scheduled from. For example, when configuring a scheduled serving cell (e.g., the cell over which the shared channel transmission is performed) for carrier aggregation (e.g., via higher layer RRC signaling), the configuration may indicate which scheduling cell will be used for provide the DCI applicable to the scheduled cell as well as the value of the CIF that will be used in DCI received via the scheduling cell in order to refer to the scheduled cell. In this manner, a given value of the CIF may be assigned to multiple scheduled serving cells by scheduling the scheduled cells using different scheduling serving cells.

Thus, when a DCI is received from the scheduling serving cell, the CIF can be interpreted based on the identity of the scheduling serving cell. In this manner, the carrier indicator field may be interpreted differently depending on the scheduling cell over which the DCI is received. A given value of the carrier indicator field may refer to a certain serving cell for receipt of the PDSCH/PUSCH transmission when received first a first serving cell, but the given value of the carrier indicator field may refer to a different scheduled serving cell for receipt of the PDSCH/PUSCH transmission when received via a second scheduling serving cell. The serving cell to which the given value of the carrier indicator field may refer may be determined based on the serving cell of the PDCCH/E-PDCCH. Further, the value of the CIF may be used to indicate where in the PDCCH/E-PDCCH and/or the search space of the PDCCH/E-PDCCH the WTRU should attempt to decode the DCI.

The scheduled serving cell to which the given value of the carrier indicator field refers may be determined from a configuration of a scheduling serving cell. Higher layers may provide the configuration of the scheduling serving cell. For example, a CIF value of "2" in a PDCCH/E-PDCCH received from a first scheduling serving cell may refer to a first scheduled serving cell. The CIF value of "2" in a PDCCH/E-PDCCH received from a second scheduling serving cell may refer to a second scheduled serving cell, if higher layers configure the two different scheduled serving cell to which the same CIF value of "2" refers according to different scheduling serving cells.

The scheduled serving cell to which the given value of the carrier indicator field refers may be determined from a group of serving cells to which the scheduling serving cell of the PDCCH/E-PDCCH containing the DCI belongs. For example, a CIF value of "3" in a PDCCH/E-PDCCH received from a scheduling serving cell belonging to a first group of serving cells may refer to the third scheduled serving cell configured within the first group of serving cells. A CIF value of "3" in a PDCCH/E-PDCCH received from a scheduling serving cell belonging to a second group of serving cells may refer to the third scheduled serving cell configured within the second group of serving cells.

The group identity may be associated with MAC activation/de-activation. The serving cell corresponding to a certain bit position or field within an Activation/Deactivation MAC control element may be dependent on the serving cell from which the MAC control element is received. The serving cell corresponding to a certain bit position or field within an Activation/Deactivation MAC control element may be dependent on the group of serving cells to which the serving cell from which the MAC control element is received may belong. For instance, the serving cell corresponding to the field "C2" may be serving cell #9 if the MAC control element was received in serving cell #8 where serving cells #8 and #9 are part of the same group of serving cells. For example, the serving cell corresponding to the field "C2" may be serving cell #17 if the MAC control element was received in serving cell #18 where serving cells #17 and #18 are part of the same group of serving cells.

In another example, a certain bit position or field within an Activation/Deactivation MAC control element may indicate a group of serving cells instead of a single serving cell. For instance, the field "C3" may indicate activation or deactivation of group #3 of serving cells.

Falsely detecting payload data and misinterpreting them may reduce network performance for blind decoding. Distinguishing a correctly detected DCI and a presumably correct but falsely detected DCI (e.g., where the WTRU processing indicates that the DCI has been successfully decoded due to a decoding/processing mistake, but in fact the DCI was not meant for the WTRU) may avoid falsely detecting payload data and misinterpreting them. The WTRU may determine whether decoded information from PDCCH and/or E-PDCCH may correspond to valid DCI for the WTRU. One or more techniques may be used to determine the validity of downlink control information (DCI). For example, a WTRU may determine the validity of DCI by verifying the value of a cyclic redundancy check (CRC) that may be masked with a specific RNTI or one of a set of possible RNTIs. A WTRU may verify whether one or more fields of the DCI have valid values. For example, one or more determinations may include verifying whether all fields of the DCI have valid values. A WTRU may determine the validity of DCI based on properties of the set of DCI that is decoded in the same carriers/cells/TTIs as the carriers/cells/TTIs for the PDSCH scheduled by the DCI. A WTRU may determine the validity of DCI based on properties of the set of DCI that is decoded in the different carriers/cells/TTIs from the carriers/cells/TTIs for the PDSCH scheduled by the DCI. The WTRU may determine the validity of DCI based on verifying the value of a CRC of a determined length. The one or more techniques used to determine the validity of downlink control information (DCI) may apply to DCI of specific format(s). For example, formats that may correspond to downlink assignments (1a, 2, 2a, 2b, 2c, 2d, etc.) and/or any DCI format.

For example, validating that a DCI has been correctly decoded and it intended for the WTRU may be based on the WTRU successfully decoding multiple DCIs in a given subframe, across multiple/a set of subframes, in a given cell, and/or across multiple cells/a set of cells. For example, the WTRU may validate that a DCI was correctly received and was intended for the WTRU based on receiving multiple DCIs where each was successfully decoded using a WTRU RNTI. If multiple DCIs are not decoded correctly (e.g., a single DCI is decoded), the WTRU may determine that the DCI is in fact not for the WTRU due to a configuration indicating that multiple DCIs should be received. For example, for certain cells, DCI types, and/or TTIs, the WTRU may determine that multiple DCIs are to be decoded correctly in order to validate the concerned DCI for the cell/DCI type/TTI. For example, if a DCI is decoded for a future TTI, the validation of the DCI may include successfully decoding a DCI for the present TTI.

The one or more techniques used to determine the validity of downlink control information (DCI) may include evaluating one or more properties of the set of DCI's decoded in the same subframe as the subframe containing the PDSCH scheduled by the DCI. Determining the validity of DCI may include evaluating one or more properties of the set of DCI's decoded in the same cell as the cell through which the PDSCH scheduled by the DCI is transmitted. Determining the validity of DCI may include evaluating one or more properties of the set of DCI's decoded in other cells than the cell through which the PDSCH scheduled by the DCI is transmitted.

The properties of the DCIs that may be evaluated in order to determine whether the DCI(s) are valid may include one or more of the following: the number of DCIs of a given format and/or of any format, the number of DCIs of any format, the cell(s) in which the DCI's were decoded, and/or group thereof, the group of cell(s) in which the DCI's were decoded, the cell corresponding to the PDSCH and/or PUSCH transmission indicated by the DCI, if applicable, the group of cells corresponding to the PDSCH and/or PUSCH transmission indicated by the DCI, if applicable, whether the PDSCH transmission indicated by the DCI may be successfully decoded or not, the content of the DCI, the format of the DCI, the content of another DCI, and the format of another DCI.

The one or more techniques used to determine the validity of downlink control information (DCI) may include determining the validity of a DCI based on the number of configured cells. The WTRU may determine the validity of a DCI based on the number of activated cells. Validity determinations may include one or more criteria to be met. Validity determinations may include one or more sets of rules to be met. The criteria may include verifying the CRC parity bits of the DCI. The criteria may include verifying the CRC parity bits of the DCI after scrambling with the appropriate RNTI. The criteria may include verifying that one or more field of the payload is set to a valid possible value. For example, the criteria may include verifying that every field of the payload is set to a valid possible value.

The WTRU may perform one or more actions as a result of detecting a DCI considered valid according to at least a first set of criteria. The WTRU may perform one or more actions as a result of detecting a DCI considered valid according to at least a first set of rules. The rules and/or criteria may be as described herein. If, for example, the WTRU may determine DCI validity based on a first set of criteria and/or a first set of rules, the WTRU may attempt decoding the corresponding PDSCH. For example, if the WTRU may determine DCI validity based on a first set of criteria and/or a first rules, the WTRU may attempt decoding the corresponding PDSCH in case of a DCI indicating a PDSCH transmission. If, for example, the WTRU may determine DCI validity based on at least a second criteria and/or a second rules, the WTRU may attempt decoding the corresponding PDSCH and/or may generate HARQ A/N for the corresponding PDSCH. For example, if the WTRU may determine DCI validity based on at least a second criteria and/or a second rules in addition to the first criteria and/or the first rules, the WTRU may attempt decoding the corresponding PDSCH and/or may generate HARQ A/N for the corresponding PDSCH. For example, if the WTRU may determine DCI validity based on at least a second criteria and/or a second rules exclusive of the first criteria and/or the first rules, the WTRU may attempt decoding the corresponding PDSCH and/or may generate HARQ A/N for the corresponding PDSCH. If, for example, the WTRU may determine DCI validity based on a second set of criteria and/or a second set of rules as described herein, the WTRU may attempt decoding the corresponding PDSCH and/or may generate HARQ A/N for the corresponding PDSCH. For example, if the WTRU may determine DCI validity based on a second set of criteria and/or a second set of rules as described herein in addition to the first criteria and/or the first rules, the WTRU may attempt decoding the corresponding PDSCH and/or may generate HARQ A/N for the corresponding PDSCH. For example, if the WTRU may determine DCI validity based on a second set of criteria and/or a second set of rules as described herein exclusive of the first criteria and/or the first rules, the WTRU may attempt decoding the corresponding PDSCH and/or may generate HARQ A/N for the corresponding PDSCH. If, for example, the WTRU may detect DCI validity based on the first (set of) criteria and/or the first (set of) rules, but the WTRU may not determine DCI validity based on the second (set of) criteria and/or the second (set of) rules, the WTRU may attempt decoding the corresponding PDSCH. For example, if the WTRU may detect DCI validity based on the first (set of) criteria and/or the first (set of) rules, but the WTRU may not determine DCI validity based on the second (set of) criteria and/or the second (set of) rules, the WTRU may attempt decoding the corresponding PDSCH.

The one or more techniques used to determine the validity of downlink control information (DCI) may include evaluating certain conditions. The WTRU may determine that a DCI may be valid if one or more of the following conditions is satisfied. The conditions may include that the DCI is for a PDSCH or PUSCH in a cell belonging to a first group of cells. The conditions may include that the DCI is for a PDSCH or PUSCH in a cell belonging to a second group of cells, and/or that at least one DCI was received for a PDSCH and/or PUSCH in a cell belonging to a first group of cells. The conditions may include that the DCI is for a PDSCH or PUSCH in a cell belonging to a second group of cells, and/or that at least N DCI's were received for PDSCH and/or PUSCH in cell(s) belonging to the second group of cells. The conditions may include that a field of the DCI is set to a specific value, and/or a combination of fields of the DCI are set to specific values. For example, the WTRU may determine that a DCI may be valid at least when the value of a downlink assignment index (DAI) field is set to a specific value such as "000", for example. In another example, the WTRU may determine that a DCI may be valid at least when the value of a "last downlink assignment indicator" field is set to 1 and/or the value of a DAI field is set to "000", for example. The field(s) may be part of the "payload" of the DCI, and/or may be used to mask some bits of the CRC. The conditions may include that the contents of a second DCI indicates that the DCI may be received. The second DCI may be decoded over PDCCH, E-PDCCH and/or PDSCH). The DCI may be a downlink assignment for a given cell. The second DCI may indicate that a downlink assignment may be received for this cell. The conditions may include that the contents of a second DCI (decoded over PDCCH, E-PDCCH and/or PDSCH) indicates that a resource is available for the transmission of HARQ A/N, in case the DCI contains a downlink assignment. The second DCI may be decoded over PDCCH, E-PDCCH and/or PDSCH. The second DCI may for example include a grant for PUSCH and/or contain an indication of a resource for PUCCH. The conditions may include that the PDSCH transmission indicated by the DCI (in case of a downlink assignment) may be successfully decoded. For example, the conditions may include that the PDSCH transmission indicated by the DCI, in case of a downlink assignment, may be successfully decoded. The conditions may include that the number of configured cells (or of activated cells) is less than a number M. The number of activated cells may be less than a number M. For example, M may be set to 5.

The first and/or second groups of carriers/cells/TTIs may be configured by higher layers. For example, the first and/or second groups of cells or TTIs may be configured explicitly by higher layers. A group may be defined in terms of one or more of the following: carriers of a given band, carrier(s) corresponding to the Pcell, carrier(s) corresponding to the Scell, and carrier(s) corresponding to the Scell with PUCCH. For example, a group may be defined based on whether the carriers belong to a licensed band or an unlicensed band, for example in case of license-assisted access (LAA) operation. For example, a group may be defined based on whether the carriers belong to a licensed band or an unlicensed band in case of license-assisted access (LAA) operation.

The definition of a first and/or second group as referred to herein may depend on the cell on which a DCI was decoded. Validity is to be determined for the DCI. The definition of a first and/or second group as referred to herein may depend on the cell corresponding to the PDSCH and/or PUSCH transmission indicated by the DCI.

The one or more techniques used to determine the validity of downlink control information (DCI) may comprise possible rules for determining possible invalid DCI, based on the criteria referred to herein. The possible rules may be that the WTRU receives (e.g., at most) X DCI(s) (e.g. X=1) when up to Y serving cells configured with PDCCH are activated (e.g. Y=all). The possible rules may be that the WTRU receives (e.g., at most) X DCI(s) (e.g. X=1) but none is received on resources of one (or more) specific cell(s) configured with PDCCH (e.g. at least one PDCCH may be received for a specific group of cells). The possible rules may be that the WTRU receives DCI(s) (e.g., only) on resources associated to cells in the unlicensed band (LAA). The possible rules may be that the WTRU receives DCI(s)/PDCCH transmission(s) on resources associated with cells in the unlicensed band (LAA), but does not have any scheduling information for uplink transmission on other cells (either for at least one PUSCH transmission, for a PUCCH based on rules applicable to cells in the licensed domain, and/or due to the absence of a DCI(UCI) with dynamic scheduling for UCI transmission).

One or more rules described herein may allow a reduction of occurrences of falsely determining a valid DCI. The reduction may be significant. The probability of falsely detecting more than one DCI in a subframe may be low. The probability may be very low. The network may schedule an amount of data using a single DCI. The amount may be small. The corresponding PDSCH and/or PUSCH may be in a cell of a given group.

The one or more techniques used to determine the validity of downlink control information (DCI) may include the use of CRC of one or more (e.g. different) lengths. For example, the WTRU may determine the validity of a DCI based on verifying the value of a CRC of a determined length. The WTRU may determine the length of the CRC based on one or more of the following: a search space, a DCI format, the cell (and/or group thereof) in which the PDCCH/E-PDCCH is decoded, and/or the cell where the indicated PDSCH and/or PUSCH (and/or group thereof) is transmitted. The WTRU may determine the length of the CRC based on a search space. For example, the WTRU may determine that the CRC length is a first value, e.g. 16, if PDCCH is decoded on the common search space; and a second value, e.g. 24, if PDCCH and/or E-PDCCH is decoded on a WTRU-specific search space. The WTRU may determine the length of the CRC based on a DCI format. For example, the WTRU may determine that the CRC length is a first value, e.g. 16, if the DCI format is format 0, 1a, 1c, or 4; and a second value, e.g. 24, if the DCI format is format 2a, 2b, 2c or 2d;

The one or more techniques used to determine the validity of downlink control information (DCI) may include the use of CRC scrambling. CRC parity bits may be scrambled (and/or masked) with bits derived from at least one field. The at least one field may include, for example, one or more of the following: a radio network temporary identifier (RNTI), a WTRU transmit antenna selection field, a field that may be used to determine a codebook for HARQ A/N reporting, such as a downlink assignment index (DAI), an indicator of whether HARQ A/N is to be reported for the PDSCH transmission(s), and/or a codebook indicator, an A/N resource indicator (ARI), and/or any other DCI field.

The scrambling may be performed over a subset and/or the totality of CRC parity bits. For example, scrambling over a subset of CRC parity bits may be substantially similar to scrambling the totality of CRC parity bits using a sequence including "0" for the bit positions where no scrambling is taking place.

For example, scrambling may be performed using one or more sequences. The one or more sequences may be added to the CRC parity bits. The one or more sequences may be added to the CRC parity bits, perhaps for example before modulo 2 operation. For example, if scrambling is performed using sequences S1 and S2 corresponding to two different fields, the output Y of the scrambling operation may be expressed as Y=(C+S1+S2) mod 2 where C is the sequence of CRC parity bits.

A scrambling sequence may be determined from the value of a field or a combination of fields. A scrambling sequence may be determined from the value of a field or a combination of fields, perhaps for example based on a pre-determined mapping and/or table. For example, the scrambling sequence may be identical to the binary representation of a field (e.g. for RNTI). The scrambling sequence may be identical to the binary representation of a field (e.g. for RNTI) perhaps for example, if the binary representation has the same length as the sequence, among other scenarios. For example, the scrambling sequence may be a truncated version of the binary representation of the field. The scrambling sequence may be a truncated version of the binary representation of the field, perhaps for example if it is shorter than this binary representation, among other scenarios. For example, when the scrambling sequence is larger than the binary representation of the field (e.g., the CRC length or scrambling sequence may be 24 bits, and a RNTI field may be 16 bits), the scrambling sequence may be obtained by one or more of the following: cyclically extending the binary representation of the field, appending a fixed sequence of bits to the binary representation of the field (e.g., one or more, or all, "0", one or more, or all, "1", and so on), and/or the like.

A scrambling sequence may be generated from the combination of two or more fields by cyclically shifting the scrambling sequence determined from a first field by a number of positions determined from the value of a second field. For example, a first field may include a 16 bit RNTI. A second field may include a downlink antenna index (DAI), which for example may take 8 possible values (e.g., 0 to 7).

A scrambling sequence of 24 bits may be generated by cyclically shifting the binary representation of the RNTI by a number of positions corresponding to 3 times the value of the DAI. For example, cyclically shifting the binary representation of the RNTI may include extending as per one or more of the techniques described herein by a number of positions corresponding to 3 times the value of the DAI.

The WTRU may use the value of the scrambled (and/or masked) CRC sequence to determine whether the DCI may be valid. The WTRU may use the value of the scrambled (and/or masked) CRC sequence to determine whether the DCI may be valid, perhaps for example when receiving DCI from PDCCH and/or E-PDCCH. The WTRU may use the value of the scrambled (and/or masked) CRC sequence to determine the value of at least one field used to scramble the DCI. The WTRU may use the value of the scrambled (and/or masked) CRC sequence to determine the value of at least one field used to scramble the DCI, perhaps for example when receiving DCI from PDCCH and/or E-PDCCH. The WTRU may, for example, perform one or more of the following. The WTRU may determine the sequence of CRC parity bits C' based on the received payload bits. The WTRU may descramble the received sequence Y of scrambled CRC parity bits using a sequence S=(S1+S2+S3+ . . . ) mod 2 corresponding to a valid possible combination of values of the corresponding fields. The WTRU may determine whether the descrambled sequence (Y+S1+S2+S3+ . . . ) mod 2 matches the sequence C'. If the descrambled sequence (Y+S1+S2+S3+ . . . ) mod 2 matches the sequence C', the DCI may be considered valid. The DCI may be considered valid, possibly subject to other conditions as techniques described herein. If the descrambled sequence (Y+S1+S2+S3+) mod 2 matches the sequence C', the values of one or more field may be determined to be the ones used for determining the sequence S. For example, if the descrambled sequence (Y+S1+S2+S3+) mod 2 matches the sequence C', the values of each field may be determined to be the ones used for determining the sequence S. If the descrambled sequence (Y+S1+S2+S3+ . . . ) mod 2 does not match the sequence C', the WTRU may descramble the sequence Y using another valid possible combination of values of the fields. The WTRU may determine that the DCI is not valid if the descrambled sequence does not match the sequence C' for any valid possible combination of values of the fields The following examples may illustrate how the WTRU may use the techniques above to determine whether the DCI may be valid. In the examples, the sequence of CRC parity bits includes 24 bits. In the examples, one or more of the following fields may be used for scrambling: RNTI, Downlink antenna indicator (DAI), and/or the like.

In an example, the scrambling sequence S1 corresponding to RNTI field may include the 16 bits of the binary representation of the RNTI followed by 8 zeros. The scrambling sequence S2 corresponding to DAI may include 16 zeros that may be followed by the binary representation of the DAI which may be 8 bits in this example (perhaps for example if DAI has values ranging from 0 to 255). The WTRU may determine validity of the DCI by descrambling the sequence Y using S1 and/or determining whether the 16 first bits of the resulting sequence Z match the 16 first bits of the sequence of CRC parity bits C', perhaps for example based on the payload. If the 16 first bits match, the WTRU may consider that the DCI may be valid. The WTRU may determine the value of the DAI field by identifying the sequence S2 for which (Y+S1+S2) mod 2 corresponds to C' for the 8 last bits. The value of S2 may be determined as (Y+C') mod 2, perhaps for example since S1 may be 0 for the last 8 bits, among other scenarios. If there is not a match for the 16 first bits, the WTRU may considers that the DCI may not be valid.

In an example, the scrambling sequence S1 corresponding to RNTI field may include the 16 bits of the binary representation of the RNTI that may be followed by the 8 first bits of the same representation. The scrambling sequence S2 corresponding to DAI (which may be 6 bits for example) may include the binary representation of the DAI repeated 4 times. The WTRU may determine validity of the DCI by verifying if the sequence (Y+S1+S2) mod 2 corresponds to C' for at least one of the 64 possible S2 sequences. If there is a match for at least one of the sequences, the WTRU may consider that the DCI may be valid. The DAI value may be identified as at least one that may correspond to the matching sequence. If there is no match for any one of the sequences, the WTRU may consider that the DCI may not be valid.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:
1. A wireless transmit/receive unit (WTRU) comprising:
a processor configured to:
receive a radio resource control (RRC) configuration message, wherein the RRC configuration message indicates that a third serving cell is scheduled if carrier indicator field (CIF) reception is via a first serving cell and that a fourth serving cell is scheduled if CIF reception is via a second serving cell;
receive a downlink control channel transmission comprising a first downlink control information (DCI) via the first serving cell, wherein the first DCI indicates a CIF value;
determine that the first DCI comprises scheduling information for the third serving cell based on the RRC configuration message and the first DCI comprising the CIF value having been received via the first serving cell;
perform a first wireless communication via the third serving cell based on the determination that the first DCI comprises the scheduling information for the third serving cell;
receive a downlink control channel transmission comprising a second DCI via the second serving cell, wherein the second DCI indicates the CIF value;
determine that the second DCI comprises scheduling information for the fourth serving cell based on the

RRC configuration message and the second DCI comprising the CIF value having been received via the second serving cell; and perform a second wireless communication via the fourth serving cell based on the determination that the second DCI comprises the scheduling information for the fourth serving cell.

2. The WTRU of claim 1, wherein the scheduling information for the third serving cell comprises an uplink grant.

3. The WTRU of claim 2, wherein the first wireless communication via the third serving cell comprises a physical uplink shared channel transmission using the uplink grant, via the third serving cell.

4. The WTRU of claim 1, wherein the scheduling information for the third serving cell comprises a downlink allocation.

5. The WTRU of claim 4, wherein the first wireless communication via the third serving cell comprises a reception, via the third serving cell, of a physical downlink shared channel transmission using the downlink allocation.

6. The WTRU of claim 1, wherein the processor is configured to interpret the CIF value indicated by the first DCI based on an identity of the first serving cell over which the first DCI has been received.

7. A method performed by a wireless transmit/receive unit (WTRU), comprising:

receiving a radio resource control (RRC) configuration message, wherein the RRC configuration message indicates that a third serving cell is scheduled if CIF reception is via a first serving cell and that a fourth serving cell is scheduled if CIF reception is via a second serving cell;

receiving a downlink control channel transmission comprising a first downlink control information (DCI) via the first serving cell, wherein the first DCI indicates a CIF value;

determining that the first DCI comprises scheduling information for the third serving cell based on the RRC configuration message and the first DCI comprising the CIF value having been received via the first serving cell;

performing a first wireless communication via the third serving cell based on the determination that the first DCI comprises the scheduling information for the third serving cell;

receiving a downlink control channel transmission comprising a second DCI via the second serving cell, wherein the second DCI indicates the CIF value;

determining that the second DCI comprises scheduling information for the fourth serving cell based on the RRC configuration message and the second DCI comprising the CIF value having been received via the second serving sell; and performing a second wireless communication via the fourth serving cell based on the determination that the second DCI comprises the scheduling information for the fourth serving cell.

8. The method of claim 7, wherein the scheduling information for the third serving cell comprises an uplink grant.

9. The method of claim 8, wherein performing the first wireless communication via the third serving cell comprises sending, via the third serving cell, a physical uplink shared channel transmission using the uplink grant.

10. The method of claim 7, wherein the scheduling information for the third serving cell comprises a downlink allocation.

11. The method of claim 10, wherein performing the first wireless communication via the third serving cell comprises receiving, via the third serving cell, a physical downlink shared channel transmission using the downlink allocation.

12. The method of claim 7, further comprising interpreting the CIF value indicated by the first DCI based on an identity of the first serving cell over which the first DCI has been received.

* * * * *